US 6,691,032 B1

(12) United States Patent
Irish et al.

(10) Patent No.: US 6,691,032 B1
(45) Date of Patent: Feb. 10, 2004

(54) SYSTEM AND METHOD FOR EXECUTING USER-DEFINABLE EVENTS TRIGGERED THROUGH GEOLOCATIONAL DATA DESCRIBING ZONES OF INFLUENCE

(75) Inventors: Jeremy Irish, Bellevue, WA (US); Elias Alvord, Seattle, WA (US)

(73) Assignee: Groundspeak, Inc., Seattle, WA (US)

( * ) Notice: Subject to any disclaimer, the term of this patent is extended or adjusted under 35 U.S.C. 154(b) by 0 days.

(21) Appl. No.: 10/237,292

(22) Filed: Sep. 9, 2002

(51) Int. Cl.[7] .......................... G01C 21/00; G06F 19/00
(52) U.S. Cl. .................. 701/213; 701/208; 340/309.8; 340/323 R; 702/150; 342/357.01; 273/461
(58) Field of Search ................................ 701/213, 209, 701/208, 211, 214; 340/323 R, 500, 286.02, 309.16, 309.8; 473/131, 407; 702/150; 342/357.03, 357.13, 357.01; 381/56, 61, 326; 455/556.1, 566, 418, 419, 404.2; 273/459

(56) References Cited

U.S. PATENT DOCUMENTS

| | | | | |
|---|---|---|---|---|
| 5,364,093 A | * | 11/1994 | Huston et al. | 473/407 |
| 5,648,768 A | * | 7/1997 | Bouve | 340/988 |
| 5,679,075 A | * | 10/1997 | Forrest et al. | 463/9 |
| 5,685,786 A | * | 11/1997 | Dudley | 473/407 |
| 5,797,809 A | * | 8/1998 | Hyuga | 473/407 |
| 5,924,695 A | * | 7/1999 | Heykoop | 273/459 |
| 5,933,100 A | | 8/1999 | Golding | |
| 5,942,969 A | * | 8/1999 | Wicks | 340/286.02 |
| 6,023,241 A | * | 2/2000 | Clapper | 342/357.13 |
| 6,320,495 B1 | * | 11/2001 | Sporgis | 340/323 R |
| 2003/0013483 A1 | * | 1/2003 | Ausems et al. | 455/556 |
| 2003/0095669 A1 | * | 5/2003 | Belrose et al. | 381/56 |

* cited by examiner

Primary Examiner—Thomas G. Black
Assistant Examiner—Ronnie Mancho
(74) Attorney, Agent, or Firm—Patrick J. S. Inouye

(57) ABSTRACT

A system and method for executing user-definable events triggered through geolocational data describing zones of influence is described. One or more zones of influence are defined. Each zone of influence is described by stored geolocational data and forms a logically enclosed physical space. One or more user-definable events are associated with each zone of influence. Each user-definable event specifies a trigger condition based on the stored geolocational data for the associated zone of influence. A location of a user device is identified based on further geolocational data and at least one user-definable event is triggered when the location of the user device substantially correlates to the stored geolocational data for the trigger condition of the at least one user-definable event.

73 Claims, 25 Drawing Sheets

31

33

30

32

36

34

35

130

170

210

SYSTEM AND METHOD FOR EXECUTING USER-DEFINABLE EVENTS TRIGGERED THROUGH GEOLOCATIONAL DATA DESCRIBING ZONES OF INFLUENCE

FIELD OF THE INVENTION

The present invention relates in general to dynamic user-definable event generation and, in particular, to a system and method for executing user-definable events triggered through geolocational data describing zones of influence.

BACKGROUND OF THE INVENTION

The Global Positioning System (GPS) is a satellite navigation system consisting of 24 satellites that orbit the Earth every 12 hours. GPS signals received from the satellites are processed by GPS receivers to determine location in latitude and longitude. Non-military GPS receivers are capable of determining a location with a six-meter range of accuracy.

GPS receivers are passive devices that provide relative locational data only. The locational data must be combined with maps, charts and other navigational aids to bring meaning to the latitude and longitude coordinates. Thus, GPS navigation information is most useful when used in combination with preferably automated and wireless technologies.

Accordingly, many portable and wireless computational devices, such as cellular telephones, personal data assistants, pagers and wireless electronic mail (email) clients incorporate GPS receivers, to enhance and complement the locational information provided. For instance, personal data assistants having integrated GPS receivers can provide navigational information through a portable database storing points of interest. Moreover, the processing capabilities of many of these portable devices support downloadable cartridges for utilizing the GPS receiver-provided information for customized applications.

One popular use of GPS information is a modified version of a treasure hunting game, known as geocaching. During a geocaching game, users equipped with a GPS receiver navigate from point to point using latitude and longitude values obtained by correctly solving clues received throughout the hunt. Players proceed from a starting point until the cache, that is, treasure, is found. Variations of geocaching include incorporating wireless computing technology to enable interactions directly between competing players and managed gameplay, where each player is tracked and the clues are customized based on individual progress. Other uses of GPS information are known in the art.

U.S. Pat. No. 6,320,495 discloses a treasure hunting game utilizing GPS-equipped wireless computing devices. Players are given clues or directions to proceed along one of several predetermined treasure hunting routes based on their location, as determined by a GPS receiver. Each player's position, along with the treasure hunt route, is calculated by the GPS receiver and transmitted to a software program by a wireless computing device. The first player to arrive at the treasure wins the game. However, the clues or messages provided to each player must be first determined by a centralized software program and are not dynamically triggered based on user-definable conditions.

U.S. Pat. No. 5,923,100 discloses an automobile navigation system utilizing GPS geolocational data. The vehicle location and travel time are transmitted to a central database via a wireless computing device and used to plan travel times and determine optimal travel routes. As necessary, the route is revised to adjust for deviations in travel direction and time. However, user-definable events cannot be programmed into the route planning process.

Prior art non-GPS based informational systems include infrared portable narrators. These devices store a recorded script associated with points of interest within an attraction, such as an art museum or zoo. The narrators receive infrared input signals from static display positions along the route, which trigger the playback of the narration associated with the display. However, these devices are passive and user-definable events cannot be programmed into the recorded script.

Prior art non-GPS based informational systems also include wireless messaging systems, such as the Cooltown technology developed by the Hewlett-Packard Company, Palo Alto, Calif. Mid-air messages are provided by combining GPS technology with infrared or Bluetooth-capable wireless devices. An information broadcast is triggered whenever a user enters a geographically described location. However, the Cooltown technology operates only within discrete areas and user-definable events cannot be programmed into the mid-air messaging system.

Therefore, there is a need for an approach to generating user-definable events triggered through geolocational data describing zones of influence, as well as temporal and independent conditions.

There is a further need for a framework for building user-definable events triggerable through geolocational data describing zones of influence as well as temporal and independent conditions.

There is a further need for an approach to defining locational, temporal and independent event triggers used in a combination of GPS and wireless computational technologies.

SUMMARY OF THE INVENTION

The present invention provides a system and method for producing and processing zones of influence described through locational, temporal and independent conditions. Preferably, the user is equipped with a wireless computing device having a GPS receiver and timer. A plurality of zones of influence is defined through geolocational data, preferably expressed in latitude and longitude. User-definable events are associated with the zones of influence. The events are triggered as a user transitions between, within and around the zones of influence. Timed events relative to an initial starting time and independent events can also be defined. The timed and independent events are triggered as the time limits expire and independent conditions are met.

An embodiment provides a system and method for executing user-definable events triggered through geolocational data describing zones of influence. One or more zones of influence are defined. Each zone of influence is described by stored geolocational data and forms a logically enclosed physical space. One or more user-definable events are associated with each zone of influence. Each user-definable event specifies a trigger condition based on the stored geolocational data for the associated zone of influence. A location of a user device is identified based on further geolocational data and at least one user-definable event is triggered when the location of the user device substantially correlates to the stored geolocational data for the trigger condition of the at least one user-definable event.

A further embodiment provides a system and method for producing user-definable events triggerable through geolocational data describing zones of influence. One or more templates are maintained. Each template specifies a generic layout for a cartridge expressed in a tag-delimited page description language. At least one such cartridge is defined with the templates. One or more zones of influence are described by geolocational data and form a logically enclosed physical space. One or more user-definable events are stored with each zone of influence. Each user-definable event triggers an action when a location substantially correlates to the geolocational data describing at least one zone of influence. Each cartridge is compiled into an executable script.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Cartridge: A cartridge is a collection of zones, items, events, and non-player characters, which create a user experience in the physical world using geolocational data.

Item: An item is a virtual or physical object that can be manipulated through cartridge events, player characters, or non-player characters.

Player A player character is a human player who interacts with

Character: the physical or virtual world independent of the system programming.

Non-Player A non-player character is a computer-generated entity

Character: with whom the player character can interact. Interaction occurs programmatically through query and response behaviors.

Events: Events are triggers which occur programmatically within a cartridge. There are four types of events:

(1) Recurring Events: Time-based events which reoccur at certain intervals, for example, a timer that announces the score every 15 minutes or a random movement of an non-player character.

(2) Triggered Events: Time-based events which occur after a certain amount of time has passed, for example, a clock that chimes every hour and half-hour. Alternatively, events which occur at an exact time, for example, at 4:00 pm, a door opens, then closes again at 4:15 pm.

(3) Conditional Triggered Events: Time-based events which occur when certain conditions exist at certain time intervals or exact times, for example, if a zone has been entered and the player character has x item, the door will open at 4:00 pm.

(4) Non-Timed Events: Non-time-based-events which occur based on locational or independent conditions.

Locational conditions are met when a player character enters, exits or is proximate to a zone of influence, player character, non-player character, or object. An independent condition is met when a user-initiated, player character, or non-player character, action occurs.

The foregoing terms are used throughout this document and, unless indicated otherwise, are assigned the meanings presented above.

Figure 1A:
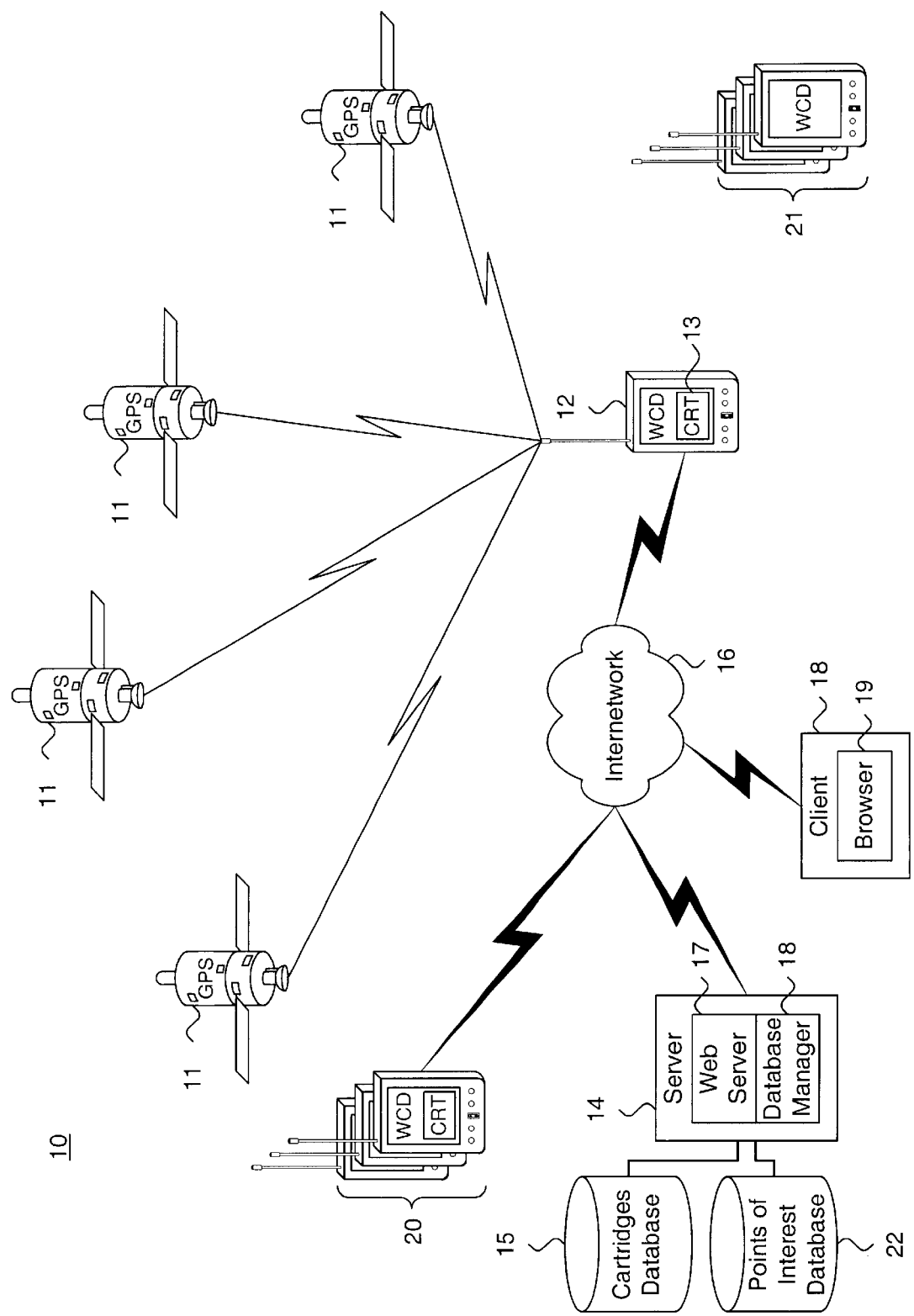
FIG. 1A is a block diagram showing a system for executing user-definable events triggered through geolocational data describing zones of influence, in accordance with the present invention.

FIG. 1A is a block diagram showing a system 10 for executing user-definable events triggered through geolocational data describing zones of influence, in accordance with the present invention. The system 10 operates in accordance with a sequence of process steps, as further described below with reference to FIG. 10.

A constellation of global positioning system (GPS) satellites 11 provides geolocational data to a wireless computing device (WCD) 12. GPS satellites 11 transmit geolocational data, including latitude, longitude, altitude, and precision. The wireless computing device 12, incorporating a GPS receiver, receives GPS signals from the GPS satellites 11 and processes the GPS signals to determine the location of the wireless computing device 12. In addition, the wireless computing device 12 executes a cartridge (CRT) 13 to trigger user-definable events when the location of the wireless computing device correlates to geolocational data describing one or more zones of influence, as further described below beginning with reference to FIGS. 2A and 2B.

Although a wireless computing device 12 is shown, other forms and arrangements of devices could be used. At a minimum, the device must be capable of executing a cartridge 13, of determining a location from geolocational data, minimally consisting of latitude and longitude, and of providing some form of output responsive to a triggered event. Processing devices capable of executing a cartridge 13 include a personal or laptop computer, either a wireless or standard personal data assistant, a programmable cellular telephone, a programmable pager, a wireless email client, a two-way radio, and a dedicated processing device. Locational devices capable of determining a location from geolocational data include a standalone GPS receiver attached via a conventional cable, GPS receiver components incorporated into a processing device, such as a wireless personal data assistance with internal GPS receiver, and receiver for receiving signals from a stationary GPS beacon, as described below with reference to FIG. 1B. Output devices include any of the processing devices, as well as augmented reality devices working in conjunction with or as an alternative to the processing devices to provide an output platform for presenting triggered events. Augmented reality devices include "Heads Up" Displays (HUDs), virtual reality eyewear, gloves, earphones and goggles, and any other form of display device, as is known in the art. Accordingly, the term wireless computing device 12 will apply broadly to any arrangement, configuration or combination of processing, locational and output devices having the aforementioned capabilities and which could be used interchangeably herein, as would be recognized by one skilled in the art.

The wireless computing device 12 downloads the cartridge 13 from a centralized server 14 via an internetwork 16, such as the Internet, or similar means for interconnecting computational devices. The centralized server 14 includes a Web server 17 and database manager 18. The Web server 17 serves Web content to the wireless computing device 12 to facilitate the retrieval of the cartridge 13 from a cartridges database 15 coupled to the centralized server 14. The centralized server 14 also includes a database manager 18 that accesses the cartridges database 15 to retrieve the requested cartridge 13. A client 18 interconnected to the centralized server 14 via the internetwork 16 executes a Web browser 19 to display Web content received from the centralized server 14. The client 18 can be used to organize the cartridges database 15 and to build new cartridges for use in a wireless computing device 12, as further described below with reference to FIG. 8.

A sequence of events is stored in the cartridge 13. Events can be logically linked to one or more zones of influence, which logically define an enclosed space through which the user progresses, or can be defined as global or "world" event, independent of any zone of influence. The events are triggered based on locational, temporal, and independent conditions. In the described embodiment, a plurality of zones of influence are described using geolocational data to define a logically enclosed space. Each non-time-based and non-global event is triggered as the wireless computing device 12 progresses through the associated zones of influence. The operator of the wireless computing device 12, referred as a player character, receives a dialog in the form of an interactive, story-like experience throughout the event sequence via the wireless computing device 12. In a further embodiment, the player character competes against other player characters also having wireless computing devices 20. Additionally, the actions of other non-player characters having wireless computing devices 21 can also factor into the progress of the event sequence.

Optionally, the wireless computing device 12 can also download information from a points of interest database 22 from the centralized server 14. The points of interest database 22 includes general and specialized information, which can be retrieved via the wireless computing device 12 in an interactive session. The points of interest information includes thematic data, such as bird watching sites, sushi restaurants and sponsor locations. The wireless computing device 12 can determine and provide directions to individual points of interest through server-provided geolocational data.

The individual computer systems, including server 14 and client 18, include general purpose, programmed digital computing devices consisting of a central processing unit (CPU), random access memory (RAM), non-volatile secondary storage, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Figure 1B:
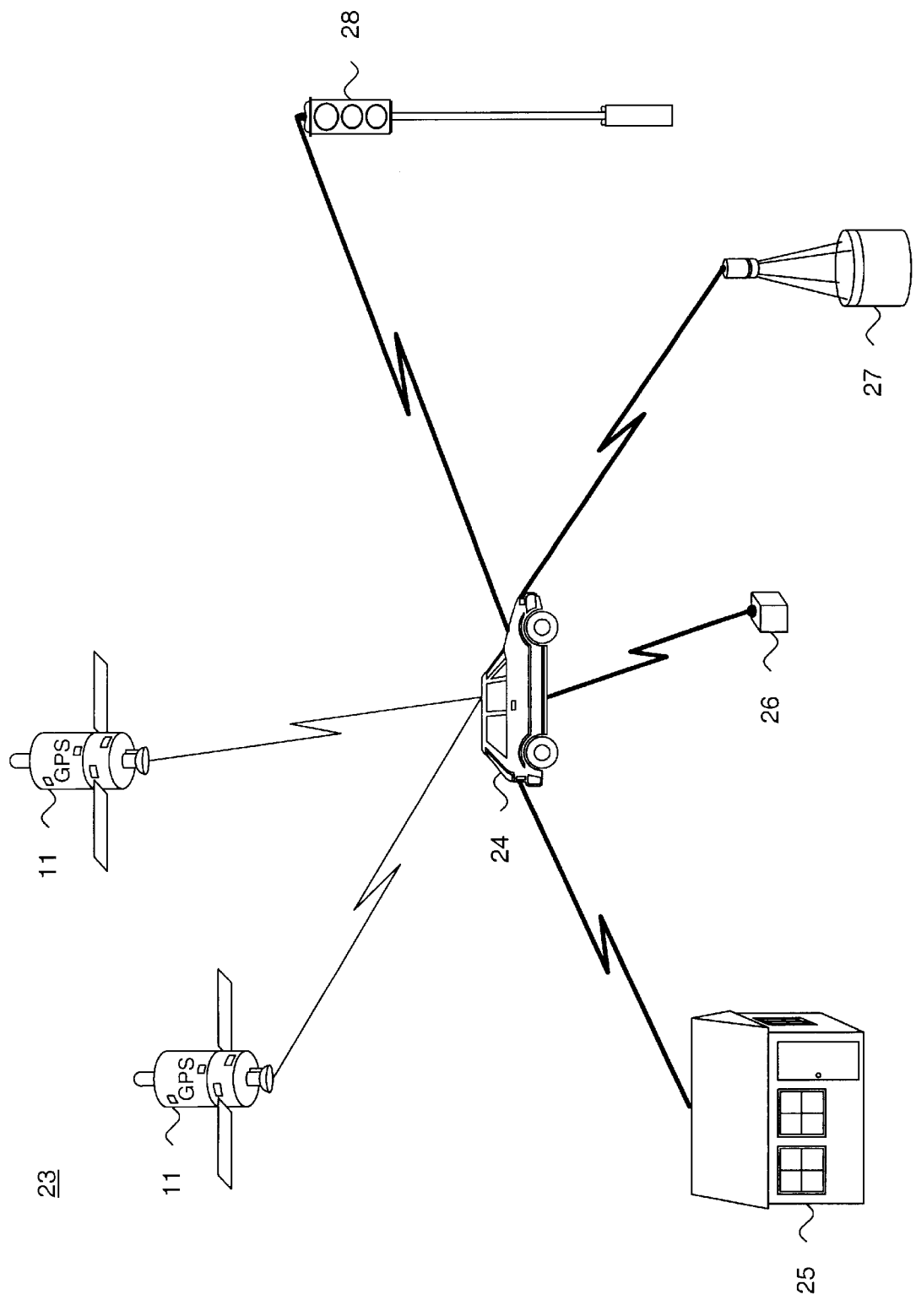
FIG. 1B is a block diagram showing a further embodiment of the system of FIG. 1A.

FIG. 1B is a block diagram showing a further embodiment 23 of the system 10 of FIG. 1A. Ordinarily, GPS signals can only be received out-of-doors by a GPS-capable receiver. In the further embodiment 23, stationary GPS beacons transmit static geolocational and informational data on a substantially continuous basis to provide conventional GPS signals indoors and in areas without GPS coverage. The geolocational data identifies the locations of stationary and non-stationary objects. Each beacon includes a short-range transmitter capable of providing GPS-equivalent signals whenever a GPS receiver cannot receive regular GPS signals and is proximate to the beacon.

For instance, a vehicle 24 equipped with a GPS receiver will ordinarily only receive GPS signals from the constellation of GPS satellites 11. However, GPS short-range beacons can be located in a building 25, at a landmark 26, on a marine buoy 27, and on a traffic signal 28, for example, and in other stationary or non-stationary objects to provide static geolocational data, each short-range beacon continually transmits geolocational data. In addition, the short-range beacons can transmit informational messages, which can be used in conjunction with an event sequence.

In the described embodiment, each short-range beacon 25–28 operates as a low-powered radio frequency transmitter, such as provided in accordance with IEEE 802.11b, "Bluetooth" or similar wireless protocols. The short-range beacons can be portable or mounted on a stationary object and transmit standard GPS geolocational data, including latitude, longitude, altitude, date and time, identification, and, optionally, executable program code. Other arrangements of GPS and short-range transmission components are feasible, as would be recognized by one skilled in the art.

Alternatively, each short-range beacon 25–28 transmits non-standard GPS geolocational data, in accordance with a wireless protocol, such as the Short Message Service (SMS). A psuedo-GPS receiver is provided communicatively interposed between the GPS receiver circuitry and the general purpose processor. The psuedo-GPS receiver translates packets received from the short-range beacon in a non-GPS compatible format and extracts and forwards the GPS signals received from the beacon. Pseudo-GPS receivers allow backward compatibility with devices limited to receiving GPS signals only.

Figure 2B:
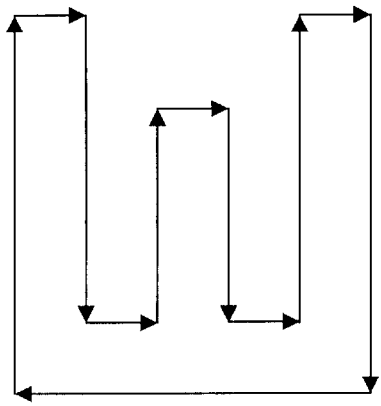
FIGS. 2A and 2B are template drawings showing, by way of example, arbitrary two-dimensional vector-based zones of influence.
Figure 2A:
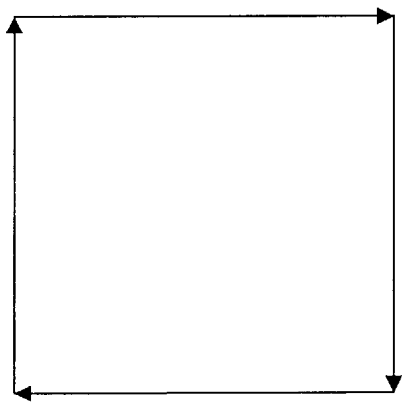

FIGS. 2A and 2B are template drawings showing, by way of example, arbitrary two-dimensional vector-based zones of influence. Vector-based zones of influence are definable by specifying a starting point, vector angle, and distance. Referring first to FIG. 2A, a square zone of influence 30 is logically defined by a set of four straight line vectors. Referring next to FIG. 2B, a zone of influence 31 roughly shaped as the letter 'E' is logically defined by a set of twelve straight line vectors. Other analogous forms of defining vector-based zones of influence, such as through polar or Cartesian coordinates, are possible, as would be recognized by one skilled in the art.

Figure 3B:
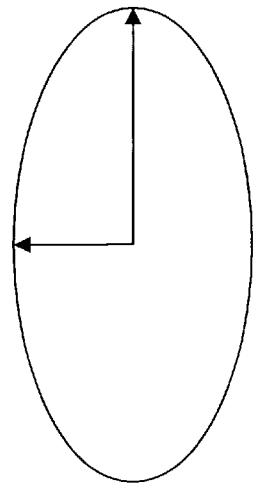
FIGS. 3A and 3B are template drawings showing, by way of example, arbitrary two-dimensional point-radius zones of influence.
Figure 3A:
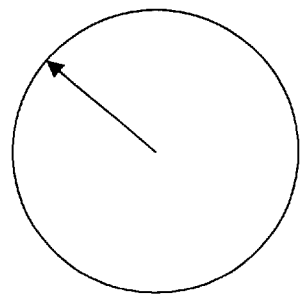

FIGS. 3A and 3B are template drawings showing, by way of example, arbitrary two-dimensional point-radius zones of influence. Point-radius zones of influence are definable by specifying one or more centers or foci and associated radii. Referring first to FIG. 3A, a circular zone of influence 32 is formed by specifying a radius projected from a center. Referring next to FIG. 3B, an elliptical zone of influence 33 is formed specifying major and minor axes projected from a center. Alternatively, the elliptical zone of influence 33 could be specified by a pair of foci (not shown). Other forms of point-radius zones of influence are possible, as would be recognized by one skilled in the art.

Figure 4:
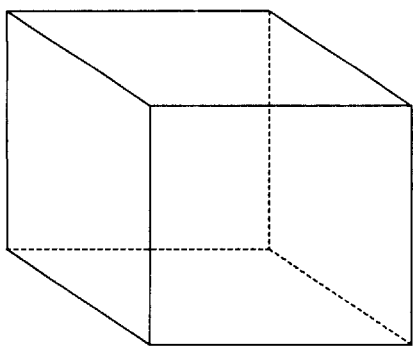
FIG. 4 is a template drawing showing, by way of example, an arbitrary three-dimensional vector-based zone of influence.

FIG. 4 is a template drawing showing, by way of example, an arbitrary three-dimensional vector-based zones of influence. Three-dimensional vector-based zones of influence are definable by specifying a starting point, vector angle, distance, and height. A cubical zone of influence 34 is defined by a set of 12 individual vectors formed into a cube. Other forms of three-dimensional vector-based zones of influence are possible, as would be recognized by one skilled in the art.

Figure 5B:
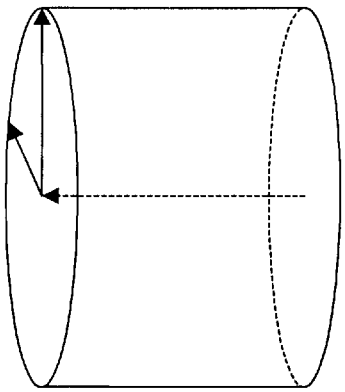
FIGS. 5A and 5B are template drawings showing, by way of example, arbitrary three-dimensional point-radius zones of influence.
Figure 5A:
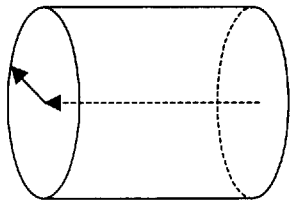

FIGS. 5A and 5B are template drawings showing, by way of example, arbitrary three-dimensional point-radius zones of influence. Three-dimensional point-radius zones of influence are definable by specifying one or more foci and associated radii and a height. Referring first to FIG. 5A, a cylindrical zone of influence 35 is defined by a two-dimensional circular zone of influence specified with a height. Referring next to FIG. 5B, an elliptical cylindrical zone of influence 36 is defined by an elliptical zone of influence projected with a given height. Other forms of three-dimensional radius zones of influence are possible, as would be recognized by one skilled in the art.

Figure 6:
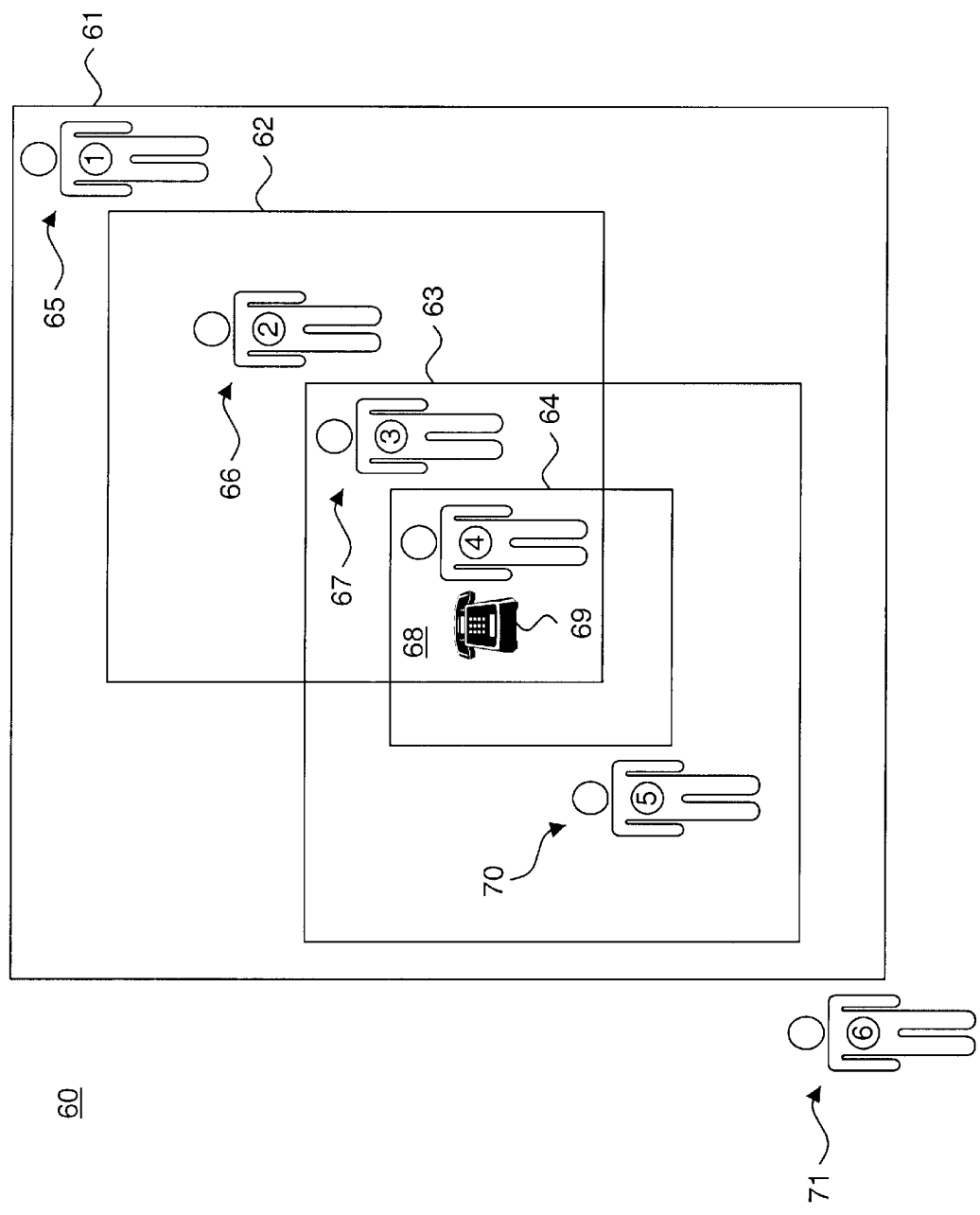
FIG. 6 is a map diagram showing, by way of example, interrelated zones of influence.

FIG. 6 is a map diagram 60 showing, by way of example, interrelated zones of influence 61–64. Each of the zones of influence 61–64 is a user-definable vector storing geolocational data, which describe a logically enclosed space. The geolocational data specifies latitude, longitude, altitude, time, date, identification, security code, signal strength, and similar relevant data, as would be recognized by one skilled in the art.

A zone of influence 61–64 can have any shape and size limited, however, by the maximum accuracy of GPS technology. In the described embodiment, an accuracy of six meters is utilized. Individual zones of influence 61–64 can be discrete from each other, overlapping, nested, layered, or adjoining.

As well, any zone of influence can inherit attributes and events from other zones of influence to allow consistency across individual zones of influence. For example, a countdown timer for an activity involving solving a puzzle could be an inherited attribute. Inheritance is available between any zone of influence and does not require a priori relationships, such as parent-child associates. Zones of influence can inherit attributes and events from another zone even when those attributes and events were also inherited. A zone of influence can inherit discrete attributes and events by specifying the identifiers for another zone of influence. Alternatively, a zone of influence can inherit attributes and events from all zones of influence if no identifiers are specified.

Unlike a grid describing geographic location, the zones of influence 61–64 are flexibly defined to accommodate random event sequences, such as might be formed by a story plotline or gameplay, as with geocaching. In contrast, geographically-based grids are strictly adjoining and cannot resolve into arbitrarily defined enclosed spaces or be arranged in overlapping or nested configurations.

The purpose of a zone of influence 61–64 is to logically define an enclosed space used to trigger user-definable events stored in a cartridge 13 on a wireless computing device 12 (shown in FIG. 1). A series of zones of influence 61–64 can be formed together to create a story, dialog, game, or other type of conversation, as expressed though the triggered user-definable events.

Each event can be triggered through locational, temporal or independent conditions. Locational conditions are met when the wireless computing device 12 enters, exits or is proximate to a zone of influence, player character, non-player character, or object. A temporal condition is met when a timer expires relative to a global, zone, non-player character, user, or object condition. An independent condition is met when a user-initiated, player character, or non-player character action occurs. User-initiated actions occur with reference to the world at large, zone of influence, user, player character, non-player character, or object.

By way of example, a player character enters a first zone of influence 61 (step 1). Upon entering the first zone of influence 61, a user-definable event is triggered to play the sound of a low, muffled growl accompanied by the display on the wireless computing device 12 of the text message, "You can hear growling sounds emanating from the southwest." The player character then enters a second zone of influence 62 (step 2). While within the second zone of influence 62, growling sounds continue to play on the wireless computing device 12 and an image of a doorway is flashed to indicate to the player character that a door is nearby. Upon approaching the door, the player character enters a third zone of influence 63 (step 3). A new sound of louder (and more vicious) growling noises is played and a video segment showing scratches appearing on a door is displayed. Next, the player character enters a fourth zone of influence 64 (step 4). The wireless computing device 12 prompts the player character with the query, "Do you wish to open the door?" Upon nearing the door, a further event is triggered, causing a telephone 69 to ring and playback a prerecorded message begging the player character to not open the door. Upon exiting the fourth zone of influence 64, the player character remains within the enclosing third zone of influence 70 (step 5). Depending upon the actions previously taken by the player character, sounds of a fading growl may be played on the wireless computing device 12, accompanied by text explaining that the growling sound is fading away. However, if the door was opened, the player character will have a predetermined time during which to exit the area before a wild animal "eats" the player character. Finally, the player character exits the outermost and first zone of influence 71 (step 6). If the door was opened and the player character escaped within the time allotted, points are awarded. Otherwise, the player character receives no credit for completing the previous sequence.

Figure 7:
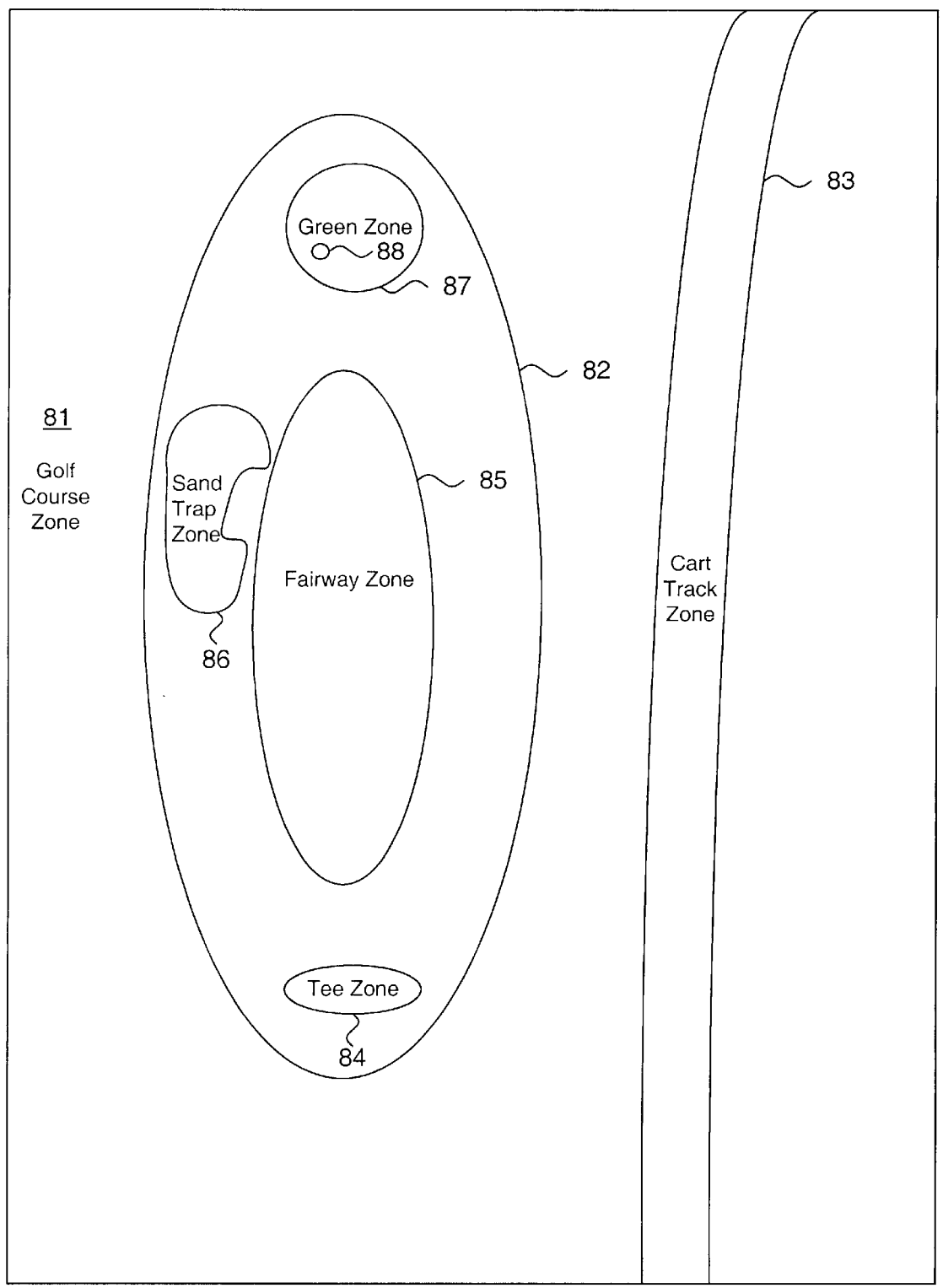
FIG. 7 is a map diagram showing, by way of further example, interrelated zones of influence.

FIG. 7 is a map diagram 80 showing, by way of further example, interrelated zones of influence 81–88. As before, each of the zones of influence 81–88 is described by geolocational data to form a logically enclosed space. In combination with events stored in the cartridge 13 (shown in FIG. 1), the zones of influence 81–88 associate individual event sequences joined by a common theme, such as playing a game of golf.

The zones of influence 81–88 include the golf course zone 81, base zone 82, cart track zone 83, tee zone 84, fairway zone 85, sand trap zone 86, green zone 87, and cup zone 88. The golf course zone 81 provides the general environment in which the event sequence operates. The base zone 86 contains multiple zones, which each inherit properties from the base zone 82. By way of example, the base zone 82 is the 18$^{th}$ Hole in the golf course zone 81. The cart track zone 83 forms a zone of influence separate from the base zone 82. The cart track zone 83 could be used to track the flow of traffic through a golf course by creating an event whenever a specific golf cart enters the cart track zone 83. The event would notify the clubhouse of movement. The tee zone 84 creates an event, "in play," which notifies the clubhouse that a user is teeing off from the 18$^{th}$ Hole. The event also queries the tee zone 84 to see if any other player is in play. If so, the event generates an alert indicating that another player is on the hole and instructing the player to wait until the other player has either moved out of range or completed the hole. The fairway zone 85 updates a location parameter to "on fairway" when the player enters the fairway. In addition, an event is created that presents options on golf clubs to use in relation to the pin and position of the golf ball. The sand trap zone 86 likewise generates an event presenting choices of golf clubs, such as a sand wedge, and further indicates the position of the golf ball from the pin.

Entering the green zone 87 triggers a plurality of events. First, a list of golf clubs, such as a choice of putter, can be displayed. As well, distance from the pin and a detailed map of the green can be provided to aid the player on putting. Note that some zone-aware items can trigger additional events, such as a golf ball tracking system that creates zone triggers. Finally, the cup zone 88 triggers a zone change when the golf ball enters the cup, which is queried to the user.

Figure 8:
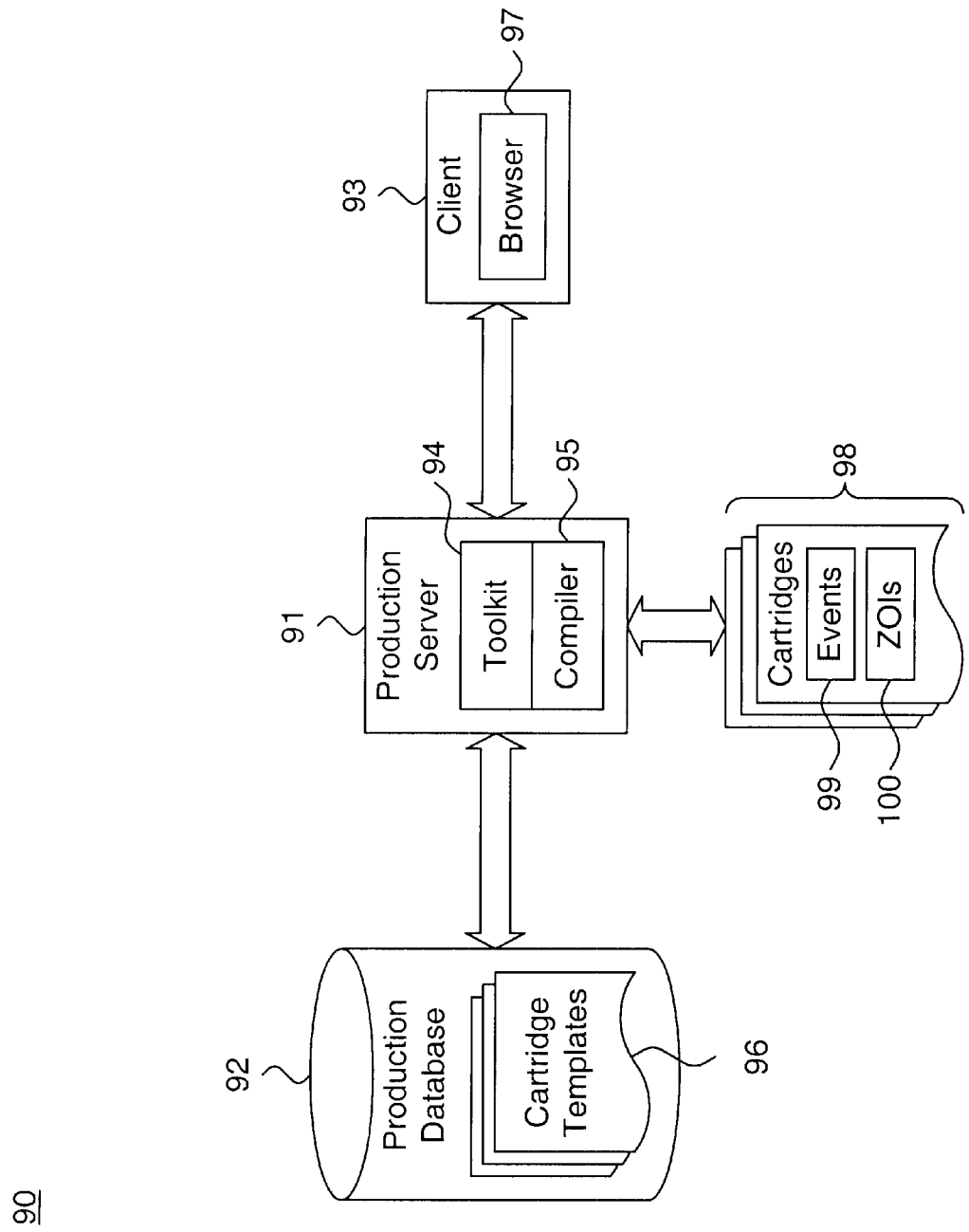
FIG. 8 is a block diagram showing the functional software components of a production system for use with the system of FIG. 1.

FIG. 8 is a block diagram showing the functional software components of a production system 90 for use with the system of FIG. 1. Each component is a computer program, procedure or process written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave.

The production system 90 provides a means with which to build user-customizable cartridges 98 for use with wireless computing devices 12 (shown in FIG. 1). The cartridges 98 are generated by a production server 91 based on user instructions received from a client 93. The production server 91 includes two components: a toolkit 94 and compiler 95. The toolkit 94 is accessed via the client 93 through a standard Web browser 97, such as the Internet Explorer or Netscape Navigator. The toolkit 94 accesses a production database 92 in which are stored cartridge templates 96, preferably expressed in a page description language, such as the Extensible markup Language (XML), such as further described below with reference to FIG. 9.

The toolkit 94 enables a user to define a series of events 99 that are triggered by temporal, locational and independent conditions and to define zones of influence (ZOIs) 100 described by geolocational data. Upon the completion of definition, the cartridge templates 96 are compiled by the compiler 95 into interpretable cartridges 98 for downloading and execution on a wireless computing device 12 (shown in FIG. 1). Although the production server 91 incorporates components XML through a standard Web browser 97, neither the production server 91, nor the took kit 94 and compiler 95 need be made available as Web-based applications and could be implemented as standard stand-alone or distributed applications and other variations, as would be recognized by one skilled in the art.

Figure 9:
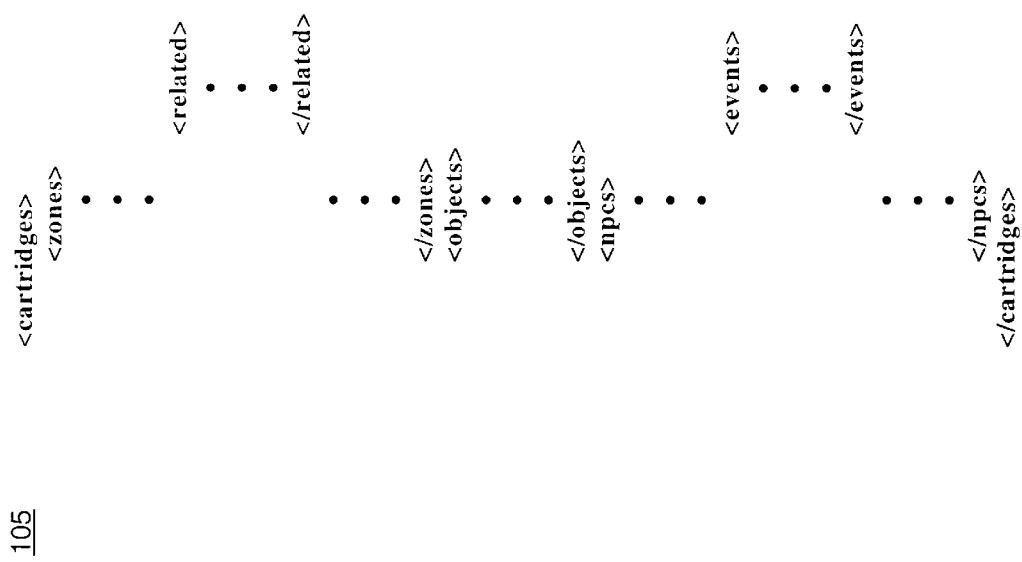
FIG. 9 is a data structure diagram showing the cartridge template utilized by the toolkit of the system of FIG. 8.

FIG. 9 is a data structure diagram showing the cartridge template 105 utilized by the toolkit of the system of FIG. 8. In the described embodiment, the cartridge template 105 is written in XML, although another form of tag-delineated page description language could be used, as would be recognized by one skilled in the art. The cartridge template 105 includes a plurality of tags to identify zones of influence (<zones>), objects (<objects>), and non-player characters (<npcs>). Each tag for a zone of influence can further define relationships through a related tag (<related>). In addition, the tag for each mobile device can define user-specified events (<events>). The events can be generic or device-dependent and include multimedia events, including sound, visual, tactile, olfactory, text, and multimedia effects, as well as other user-definable messages and communications, such as triggering a telephone call. By way of example, a source code listing for a cartridge implementing a generic golf course, such as described above with reference to FIG. 7, written in the XML programming language is included in the Appendix. Other programming languages or procedural and data structuring could be employed, as would be recognized by one skilled in the art.

Figure 10:
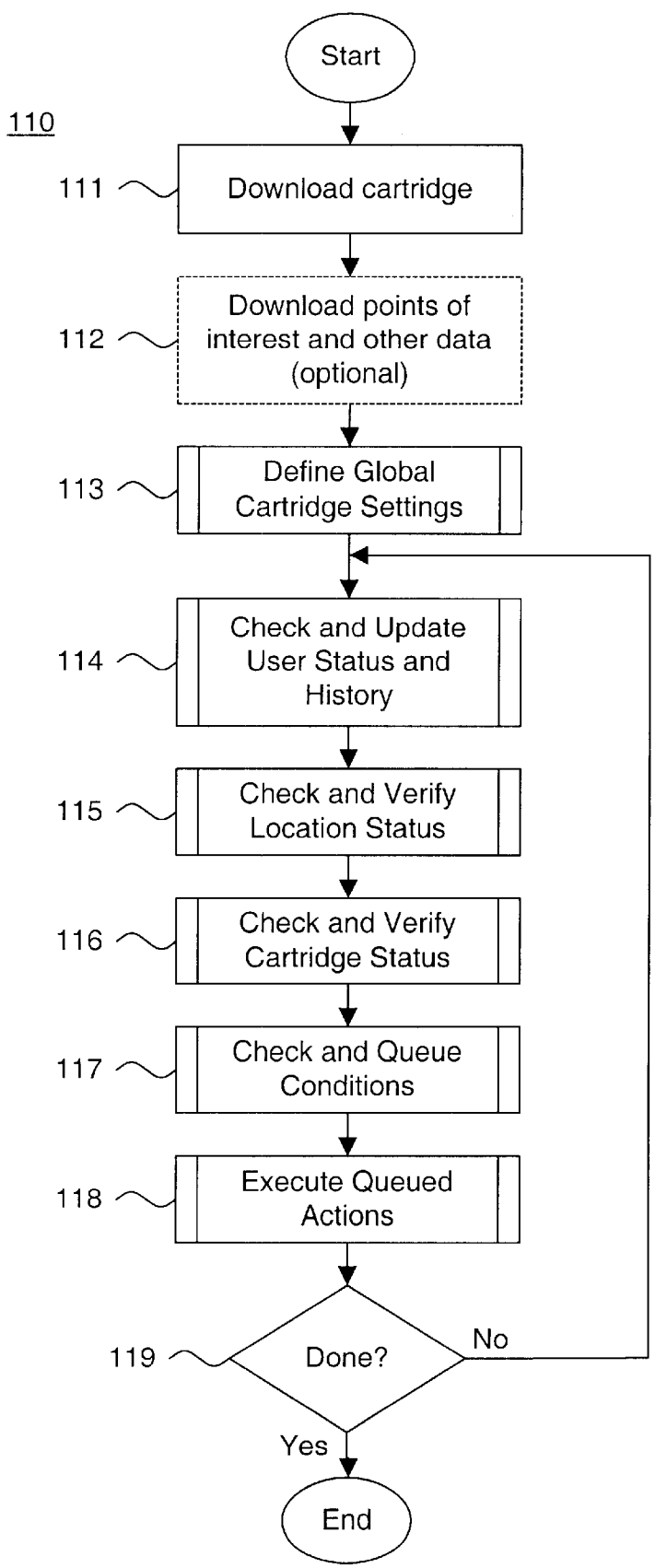
FIG. 10 is a flow diagram showing a method of executing user-definable events triggered through geolocational data describing zones of influence, in accordance with the present invention.

FIG. 10 is a flow diagram showing a method 110 of executing user-definable events triggered through geolocational data describing zones of influence, in accordance with the present invention.

The method 110 functions as a continuous control loop (blocks 114–119) executed on a wireless computing device 12 (shown in FIG. 1). During each iteration of the control loop, the status of various aspects of the wireless computing device 12 and cartridge 13 are examined and user-definable events are executed in an event-driven manner using a queue.

Preliminarily, a cartridge 13 is downloaded from the centralized server 14 (shown in FIG. 1A) (block 111). Optionally, points of interest and other data is downloaded (block 112). Global cartridge settings are then defined (block 113). The user status and history are checked and updated (block 114), as further described below with reference to FIG. 11. Next, the location status is checked and verified (block 115), as further described below with reference to FIG. 12. The status of the cartridge 13 is checked and verified (block 116), as further described below with reference to FIG. 13. Queue conditions are checked (block 117), as further described below with reference to FIG. 14. Finally, any queued event actions are executed (block 118), as further described below with reference to FIG. 15. The control loop (blocks 114–119) continues until all actions are done (block 119), after which the method terminates.

Figure 11:
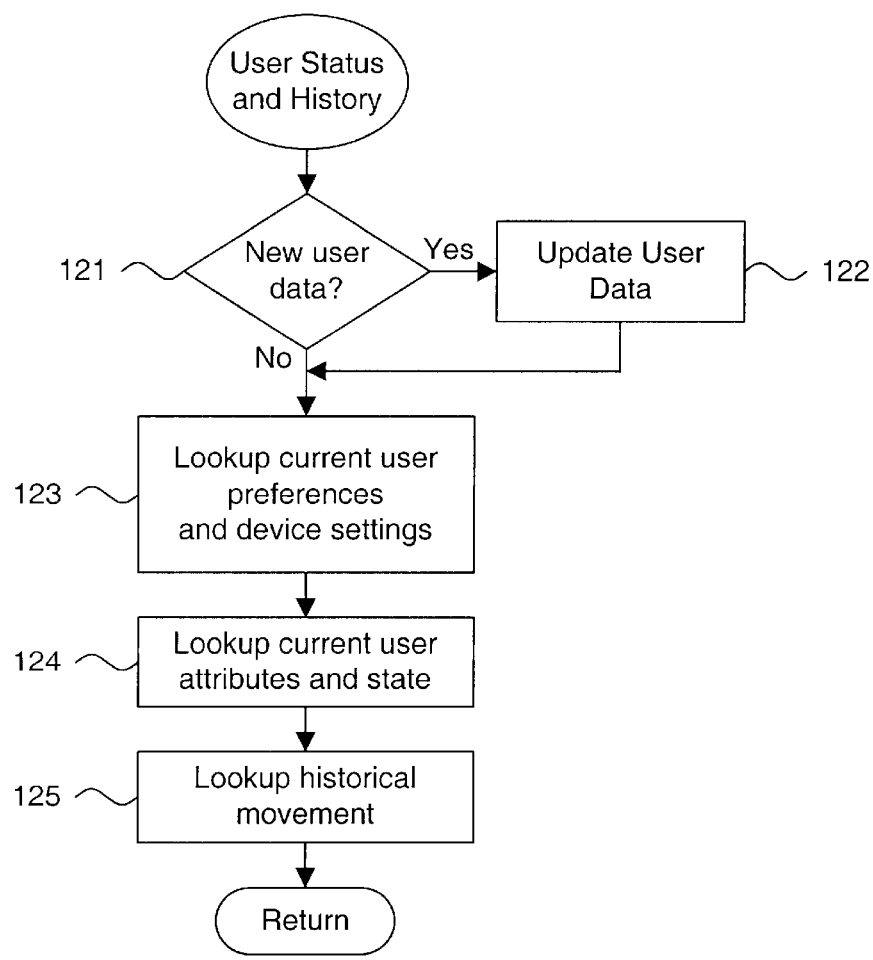
FIG. 11 is a flow diagram showing a routine for checking and updating user status and history for use in the method of FIG. 10.
Figure 14:
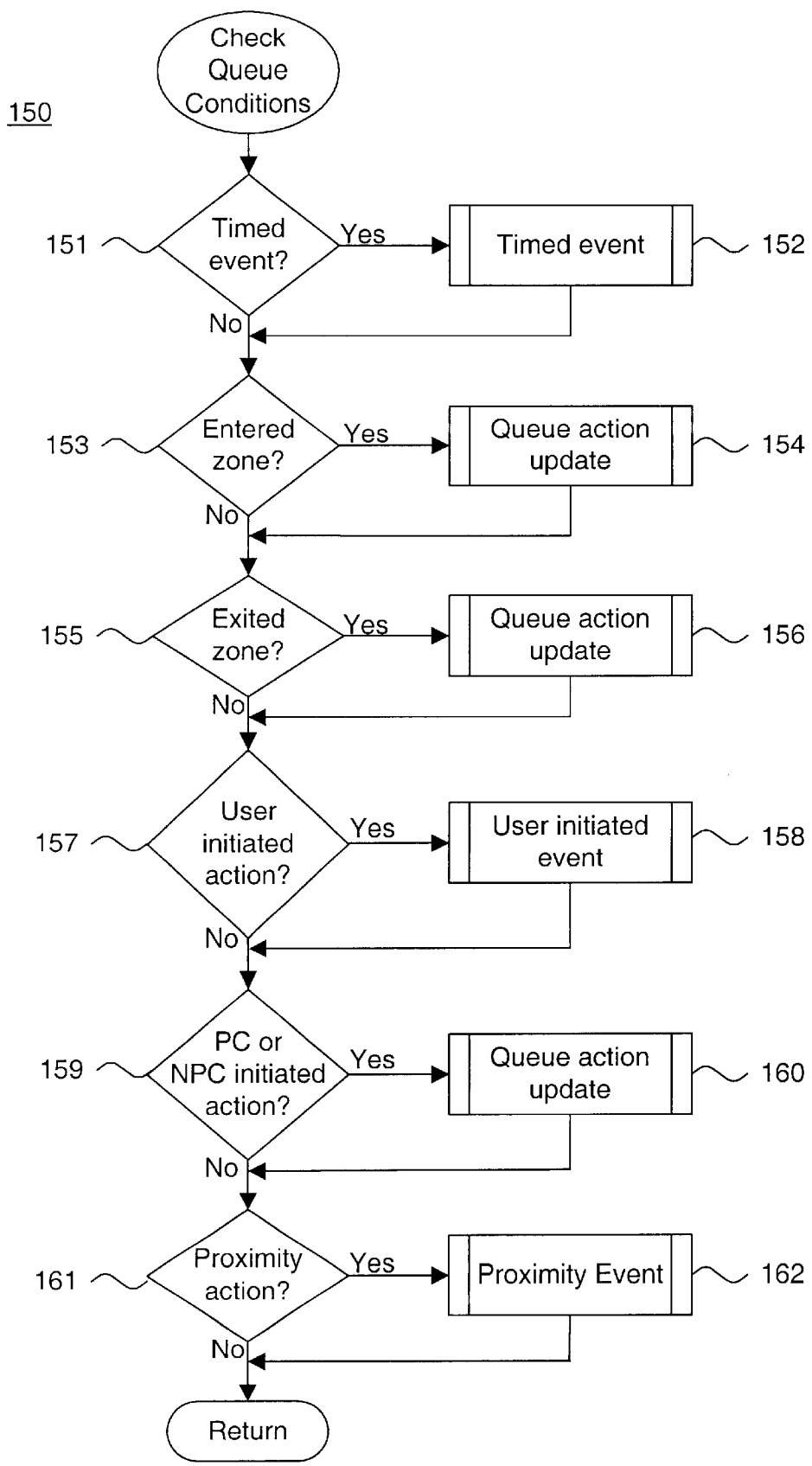
FIG. 14 is a flow diagram showing a routine for checking queue conditions for use in the method of FIG. 10.

FIG. 11 is a flow diagram showing a routine 120 for checking and updating user status and history for use in the method of FIG. 14. The purpose of this routine is to maintain historical user information regarding preferences, attributes and historical movements.

If the user data is new (block 121), the user data stored with the cartridge 13 of the wireless computing device 12 (shown in FIG. 1) is updated (block 122) to load default preferences, attributes and an initial position. Thereafter, the current user preferences and device settings (block 123), the current user attributes and state (block 124), and the historical movements (block 125) are looked up. The user preferences include notifying the user upon entry into a zone of influence, enabling flash feedback, and showing text-only feedback instead of graphical feedback. The device settings control color, monochrome, sound, screen size, video capabilities, telephone capabilities, electronic mail, short messaging service (SMS), paging, and execution of client-side code, such as J2EE scripts. User state indicates whether the user is in motion, speed, score, game state, movement history (route data), last known position, direction of movement, attributes (healthy, sick, sad, happy, and so forth), inventory, spells, characters, and access to a telephone. Historical movements are tracked by location, speed, altitude, direction, and distance. Other types and combinations of user preferences, device, settings, and state are feasible, as would be recognized by one skilled in the art. The routine then returns.

Figure 12:
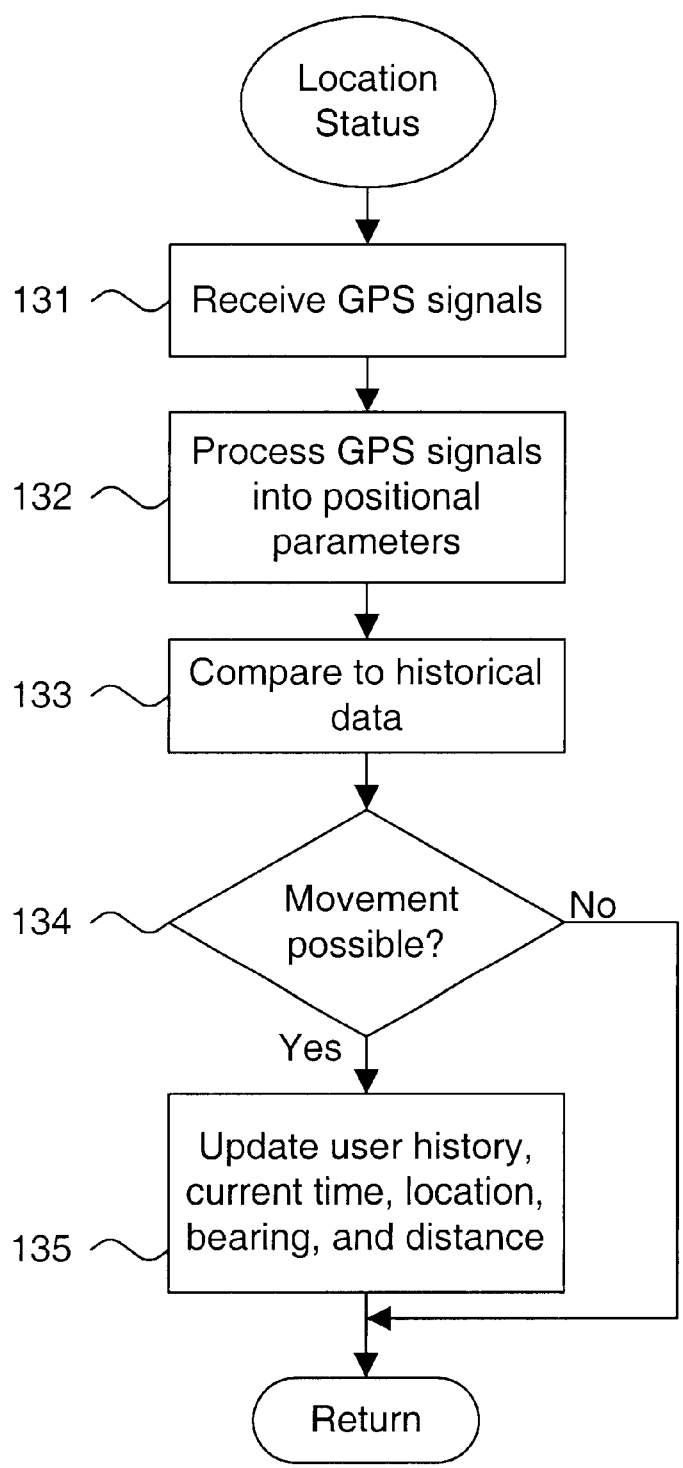
FIG. 12 is a flow diagram showing a routine for checking and verifying a location status for use in the method of FIG. 10.

FIG. 12 is a flow diagram showing a routine 130 for checking and verifying a location status for use in the method of FIG. 10. The purpose of this routine is to provide a "reality" check on an updated user movement. Improbable user movements are rejected.

First, GPS signals are received by the wireless computing device 12 (block 131) and processed into geolocational data (block 132), preferably in terms of latitudinal and longitudinal values. The geolocational data is compared to the historical data (block 133) stored as historical movements in the user data. If the movement is possible (block 134), the user history, current time, location, bearing and distance are updated (block 135). Otherwise, no update is performed. In the described embodiment, a movement is possible if, based on the user data stored with the cartridge 13 in the wireless computing device 12, the current location can be achieved in the time frame relative to the location, speed, altitude, direction and distance from the last update. The routine then returns.

Figure 13:
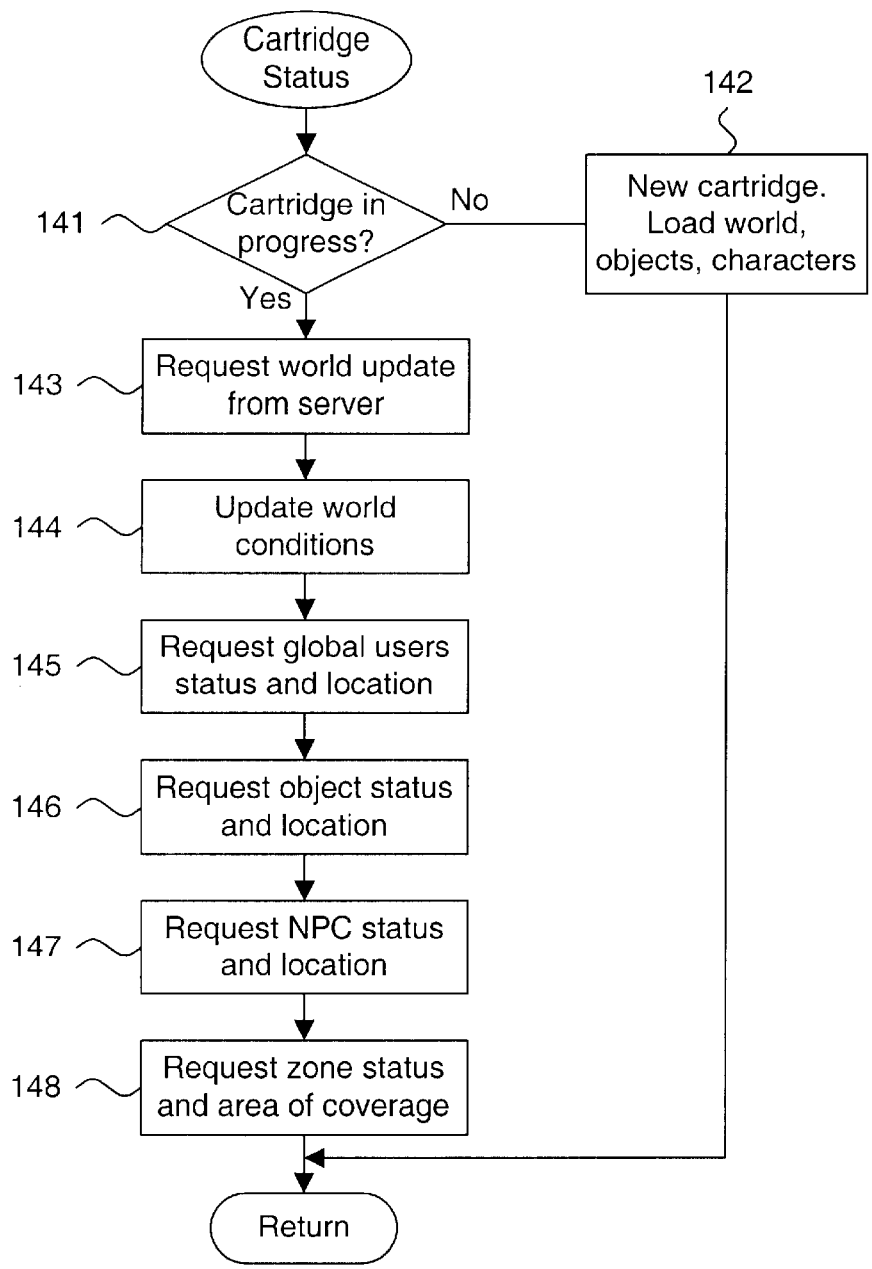
FIG. 13 is a flow diagram showing a routine for checking and verifying a cartridge status and history for use in the method of FIG. 10.

FIG. 13 is a flow diagram showing a routine 140 for checking and verifying a cartridge status and history for use in the method of FIG. 10. The purpose of this routine is to update the status of the cartridge 13 of the wireless computing device 12 (shown in FIG. 1).

If no cartridge is currently in progress (block 141), a new cartridge is loaded with a virtual world, objects and characters (block 142), after which the routine returns. Otherwise, if a cartridge is in progress (block 141), a world update is requested from the centralized server 14 (shown in FIG. 1) (block 143) and world conditions are updated within the in-progress cartridge 13 (block 144). Note the world conditions update could also be determined locally on cartridges in progress on a non-wireless computing device running a cartridge autonomously. The routine then returns.

Next, the status and locations of global users are requested from the centralized server 14 (block 145). The status and locations of objects are requested from the centralized server 14 (block 146). The status and locations of any non-player characters (NPCs) are requested from the centralized server 14 (block 147). Finally, the status and areas of coverage of the zones of influence 61–64 (shown in FIG. 6) are requested from the centralized server 14 (block 148). The status and location of the various users, objects, characters, and zones could be physical or virtual or a combination thereof. The routine then returns.

FIG. 14 is a flow diagram showing a routine 150 for checking queue conditions for use in the method of FIG. 10. The purpose of this routine is to determine the condition of the queue based on a player action. The types of actions that affect queue conditions include timed events, zone of influence entries and exits, user-, player character- and non-player character-initiated actions, and proximity actions.

If the current action is a timed event (block 151), a timed event is processed (block 152), as further described below with reference to FIG. 16. If the action is the entry into a-zone of influence 61–64 (shown in FIG. 6) by the user (block 153), a queue action and update is performed (block 154), as further described below with reference to FIG. 17. Similarly, if the user has exited the zone of influence 31–34 (block 155), a queue action and update is performed (block 156), as further described below with reference to FIG. 17. If the action is a user-initiated action (block 157), a user-initiated event is performed (block 158), as further described below with reference to FIG. 18. If the action is a player-character- or non-player-character-initiated action (block 159), a queue action and update is performed (block 160), as further described below with reference to FIG. 17. Finally, if the action is a proximity action (block 161), a proximity event is performed (block 162), as further described below with reference to FIG. 19. The routine then returns.

Figure 15:
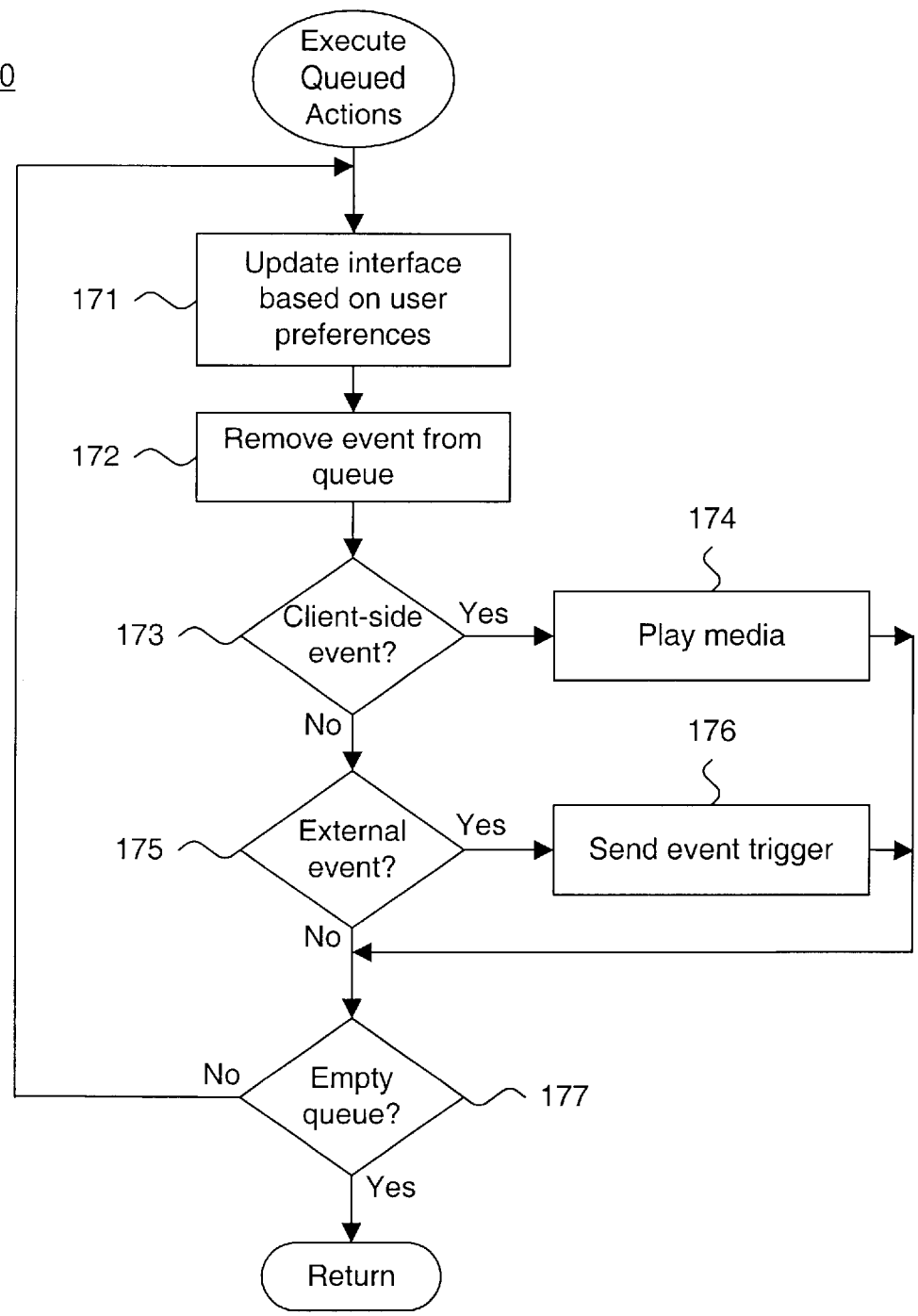
FIG. 15 is a flow diagram showing a routine for executing queued actions for use in the method of FIG. 10.

FIG. 15 is a flow diagram showing a routine 170 for executing queued actions for use in the method of FIG. 10. The purpose of this routine is to retrieve and execute actions placed in the event queue of the cartridge 13 in the wireless computing device 12 (shown in FIG. 1).

First, the user interface is updated based on user preferences (block 171). Next, an event is removed from the queue (block 172). If the event is a client-side event (block 173), the client-side event is performed (block 174) on the wireless computing device 12. Playing a media clip or sound is an example of a client-side event. Other types of client-side events are possible, as would be recognized by one skilled in the art. Otherwise, if the event is an external event (block 175), an event trigger is sent (block 176) to the external device, such as a telephone or similar instrument. Note the event trigger could also be sent to the centralized server for a team (shown in FIG. 1) to generate other triggers, such as unlocking a door. Finally, if the event queue is not empty (block 177), processing continues (block 172–176) until the queue is empty (block 177), after which the routine returns.

Figure 16:
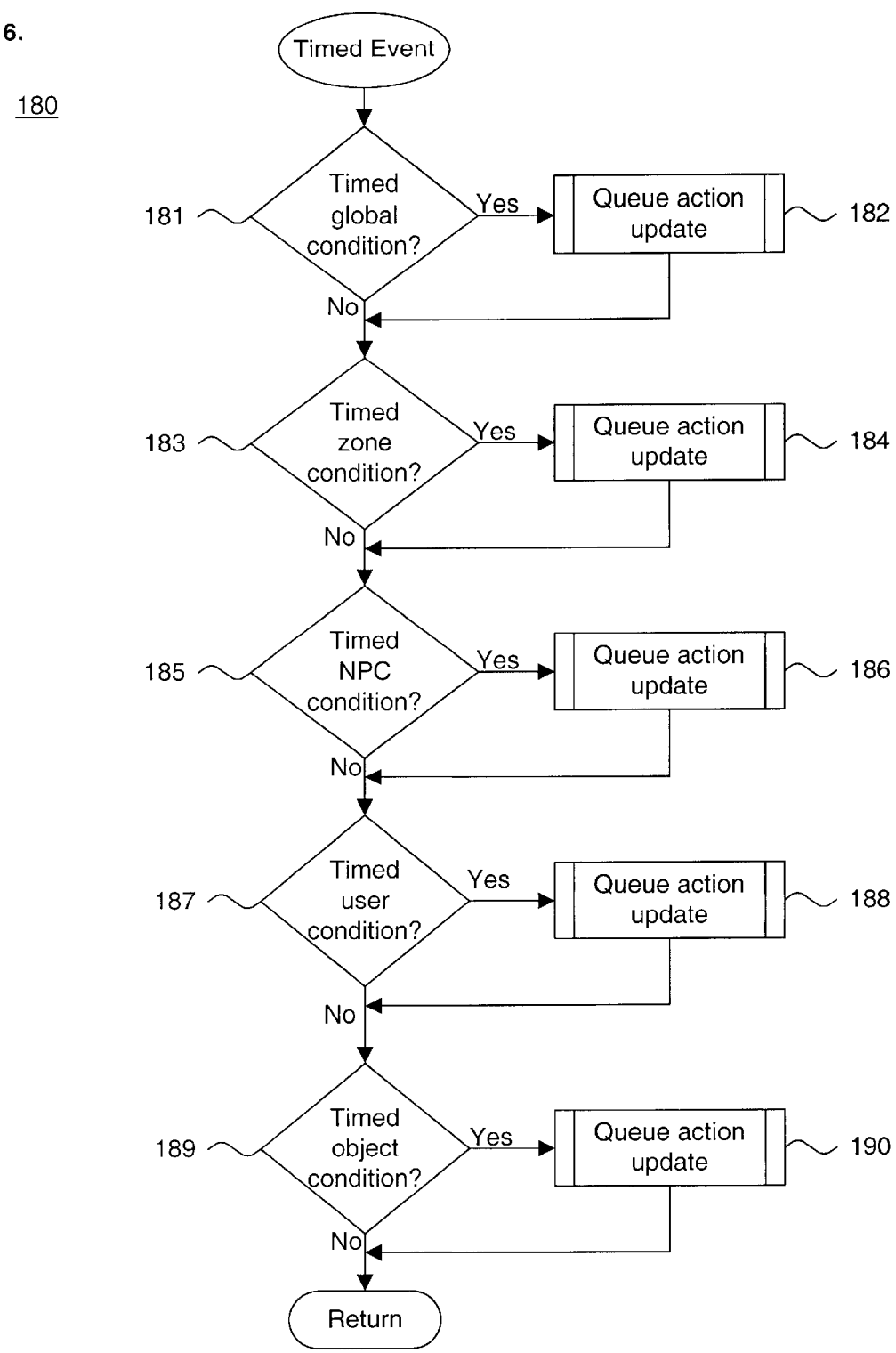
FIG. 16 is a flow diagram showing a routine for performing a timed event for use in the routine of FIG. 14.

FIG. 16 is a flow diagram showing a routine 180 for performing a timed event for use in the routine of FIG. 13. The purpose of this routine is to execute a timed event relative to an internal timer maintained by the cartridge 13 in the wireless computing device 12 (shown in FIG. 1).

First, if the timed event is a timed global condition (block 181), a queue action and update is performed (block 182), as further described below with reference to FIG. 16. Similarly, if the event is a timed zone condition (block 183), timed non-player character condition (block 185), timed user condition (block 187), or timed object condition (block 189), a queue action update is likewise performed (blocks 184, 186, 188, and 190, respectively), as further described below with reference to FIG. 17. The routine then returns.

Figure 17:
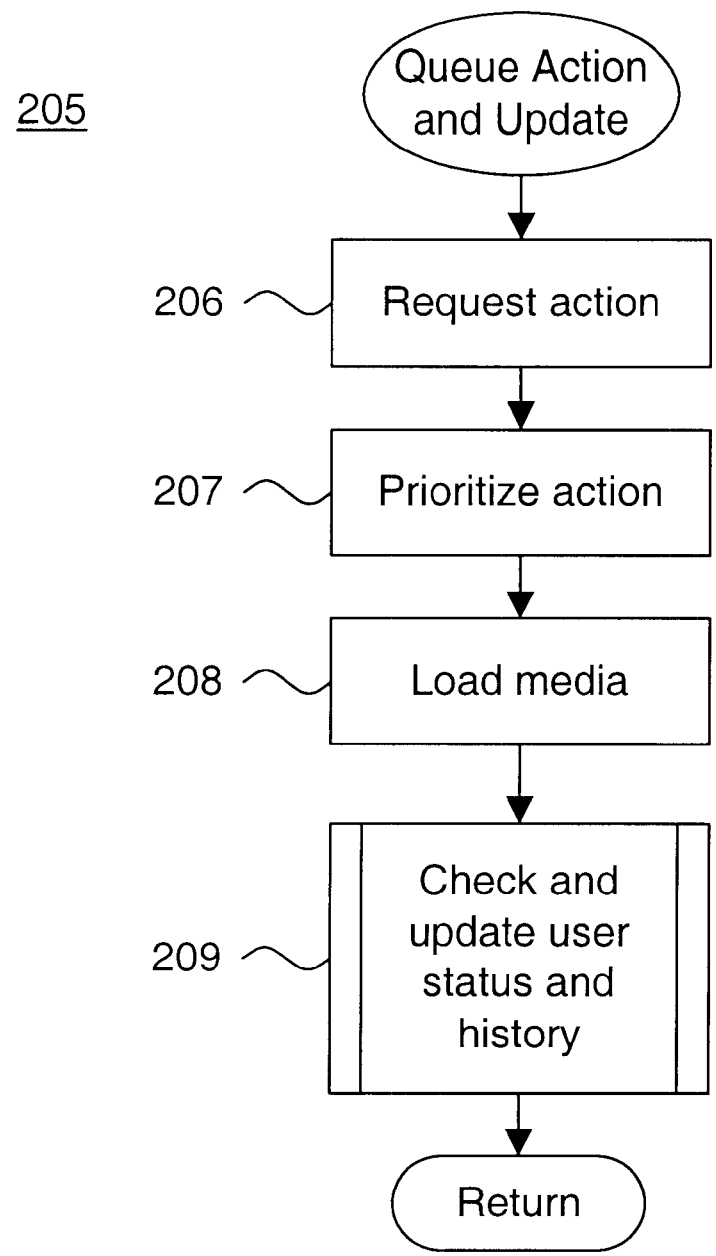
FIG. 17 is a flow diagram showing a routine for performing a queue action and update for use in the routines of FIGS. 14, 16, 18 and 19.

FIG. 17 is a flow diagram for performing a queue action 205 and update for use in the routines of FIGS. 13, 14, 15, and 169. The purpose of this routine is to place event actions into the queue of the cartridge 13 in the wireless computing device 12 (shown in FIG. 1).

First, the action is requested from the cartridge 13 (block 206) and prioritized (block 207). In the described embodiment, actions are sorted and enqueued to prioritize the actions. Next, any media is loaded (block 208), for instance, a sound file is retrieved to play a sound effect. Finally, the user status and history are checked and updated (block 209), as further described above with reference to FIG. 13. The routine then returns.

Figure 18:
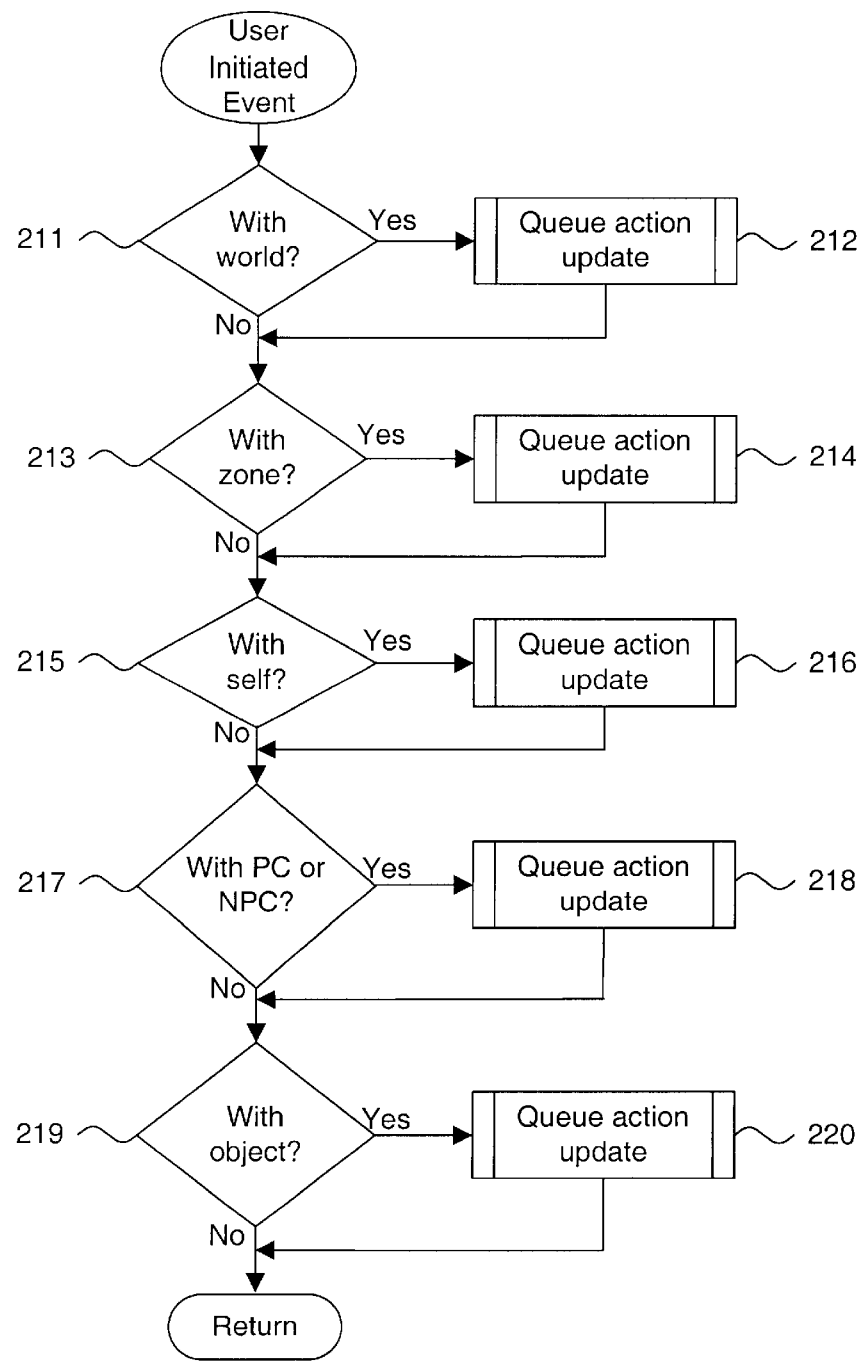
FIG. 18 is a flow diagram showing a routine for performing a user-initiated event for use in the routines of FIG. 14.

FIG. 18 is a flow diagram showing a routine 210 for performing a user-initiated event for use in the routine of FIG. 14. The purpose of this routine is to identify and enqueue a user-initiated event.

If the user-initiated event interacts with the world (block 211), a queue action and update is performed (block 212), as further described above with reference to FIG. 16. Similarly, if the user-initiated event interacts with a zone of influence 61–64 (shown in FIG. 6) (block 213), with the user (block 215), with a player character or non-player character (block 217), or with an object, (block 219), a queue action and update is performed (blocks 214, 216, 218, and 220, respectively), as further described above with reference to FIG. 16. The routine then returns.

Figure 19:
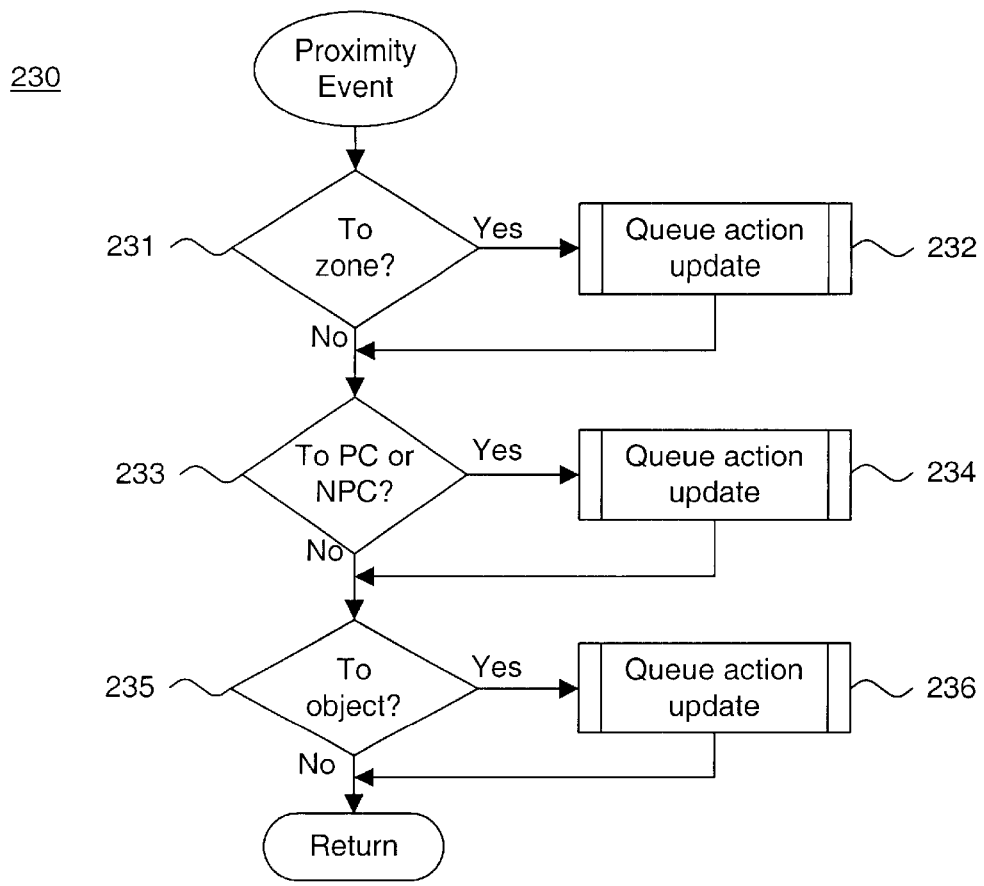
FIG. 19 is a flow diagram showing a routine for performing a proximity event for use in the routine of FIG. 14.

FIG. 19 is a flow diagram showing a routine 230 for performing a proximity event for use in the routine of FIG. 14. The purpose of this routine is to identify and execute a proximity event.

First, if the proximity event is relative to a zone of influence 31–34 (shown in FIG. 2) (block 231), a queue action and update is performed (block 232), as further described above with reference to FIG. 16. Similarly, if the proximity event is relative to a player character or non-player character (block 233), or an object (block 235), a queue action and update is performed (blocks 234 and 236, respectively), as further described above with reference to FIG. 16. The routine then returns.

While the invention has been particularly shown and described as referenced to the embodiments thereof, those skilled in the art will understand that the foregoing and other changes in form and detail may be made therein without departing from the spirit and scope of the invention.

Figure 20:
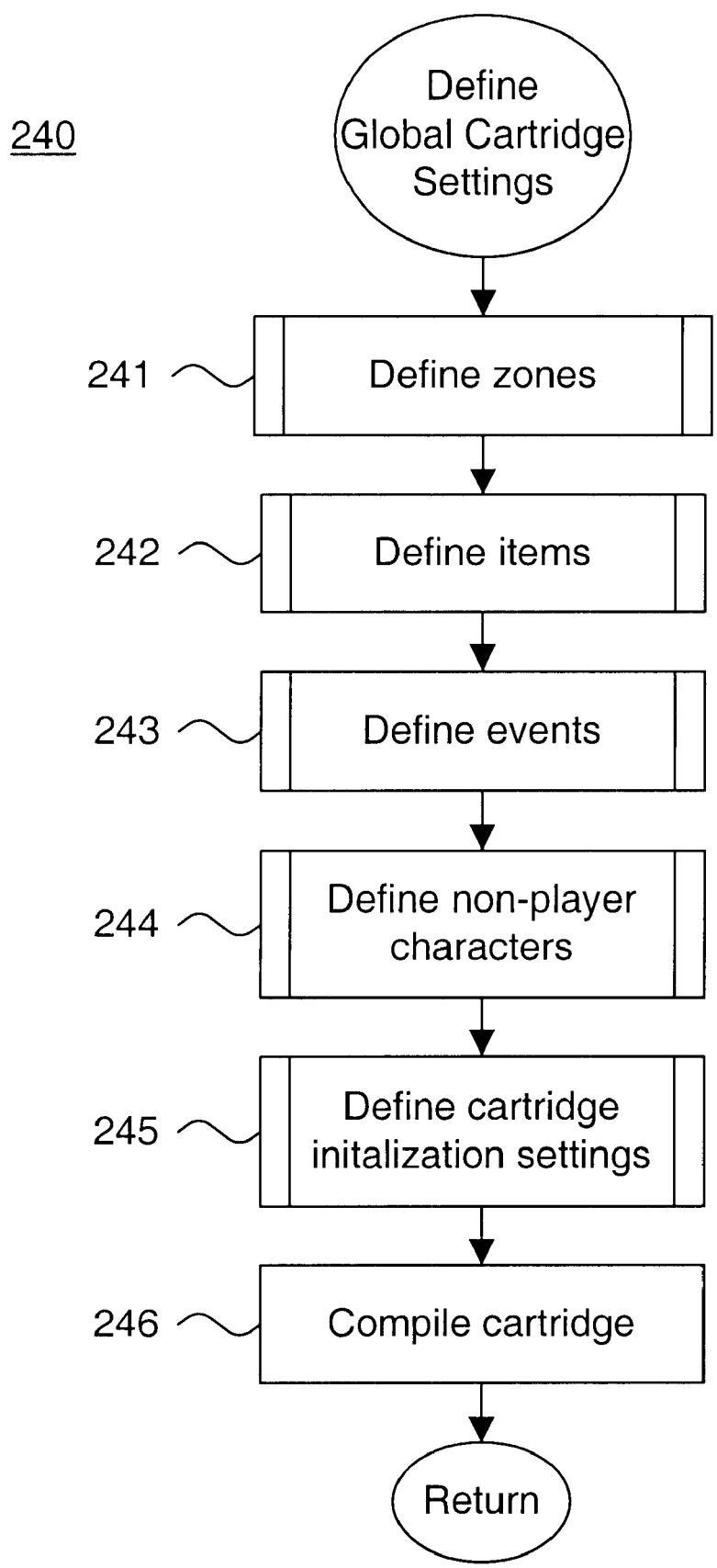
FIG. 20 is a flow diagram showing a routine for defining global cartridge settings for use in the method of FIG. 10.

FIG. 20 is a flow diagram showing a routine 240 for defining global cartridge settings for use in the method of FIG. 8. The purpose of this routine is to specify a collection of zones of influence, items, events, and non-character players, which collectively provide a user experience in the physical world using geolocational data.

First, zones of influence are defined (block 241), as further described below with reference to FIG. 21. Items are defined (block 242), as further described below with reference to FIG. 22. Events are defined (block 243), as further described below with reference to FIG. 23. Non-player characters (NPCs) are defined (block 244), as further described below with reference to FIG. 24. Cartridge initialization settings are defined (block 245), as further described below with reference to FIG. 25. Finally, the cartridge 13 (shown in FIG. 1A) is compiled (block 246) into program code interpretable by the wireless computing device 12. The routine then returns.

Figure 21:
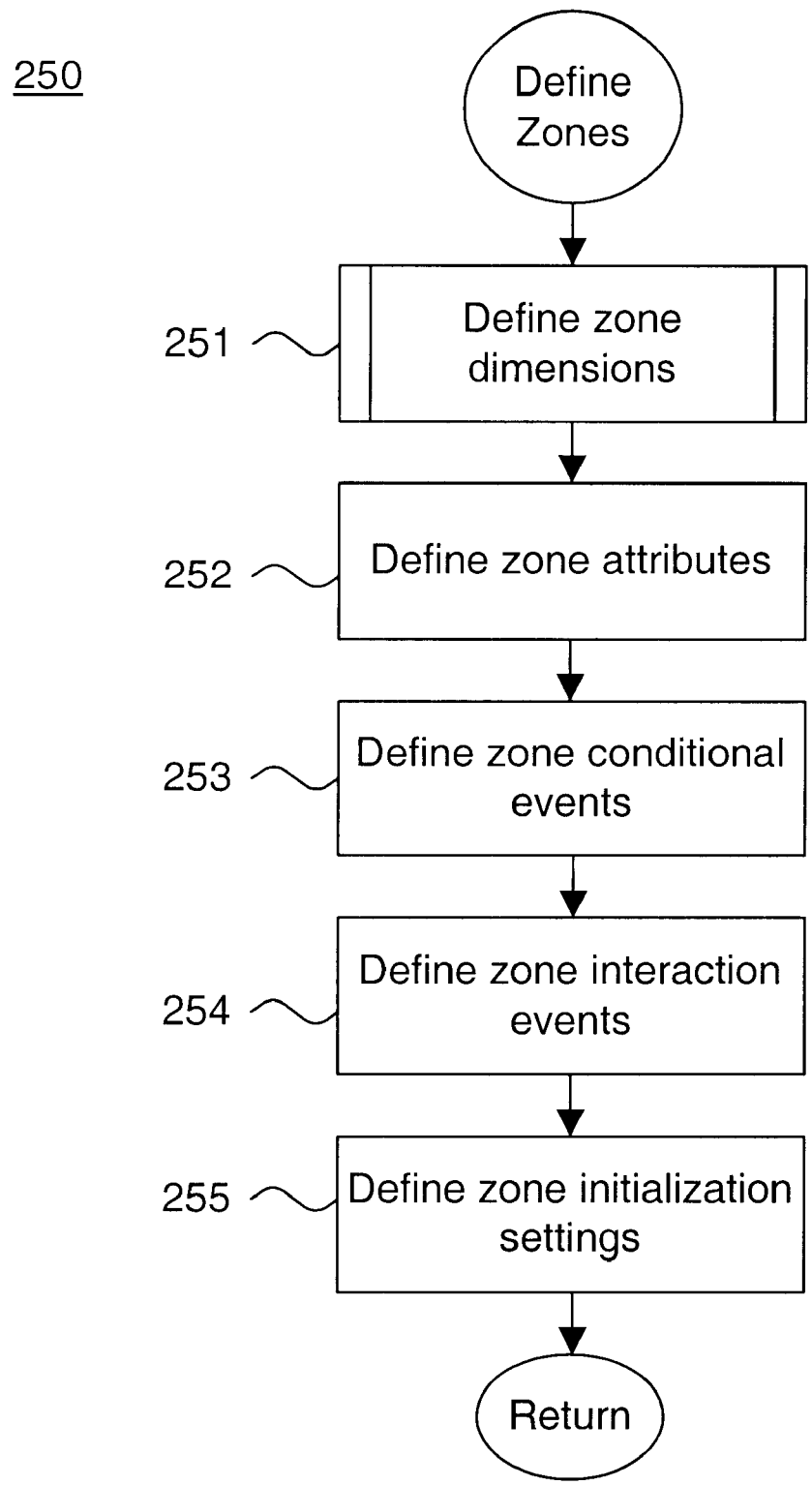
FIG. 21 is a flow diagram showing a routine for defining zones of influence for use in the routine of FIG. 20.

FIG. 21 is a flow diagram showing the routine 250 for defining zones of influence for use in the routine of FIG. 20. The purpose of this routine is to specify zone geolocational data and to associate events with zones.

First, the dimensions of each zone of influence are defined (block 251), as further described below with reference to FIG. 26. The zone attributes are then defined (block 252). The attributes include initialization and state settings and relationships to other zones of influence. For instance, if the present zone of influence inherits from a parent zone, the attributes for the parent zone of influence are copied. Next, any events which occur conditionally with respect to the zone of influence are defined (block 253).

In addition, events defining interactions between zones of influence are defined (block 254). Interaction events carry over between successive zones of influence to provide a continuous storyline. Finally, the initialization settings for the zone of influence are defined (block 255), after which the routine returns.

Figure 22:
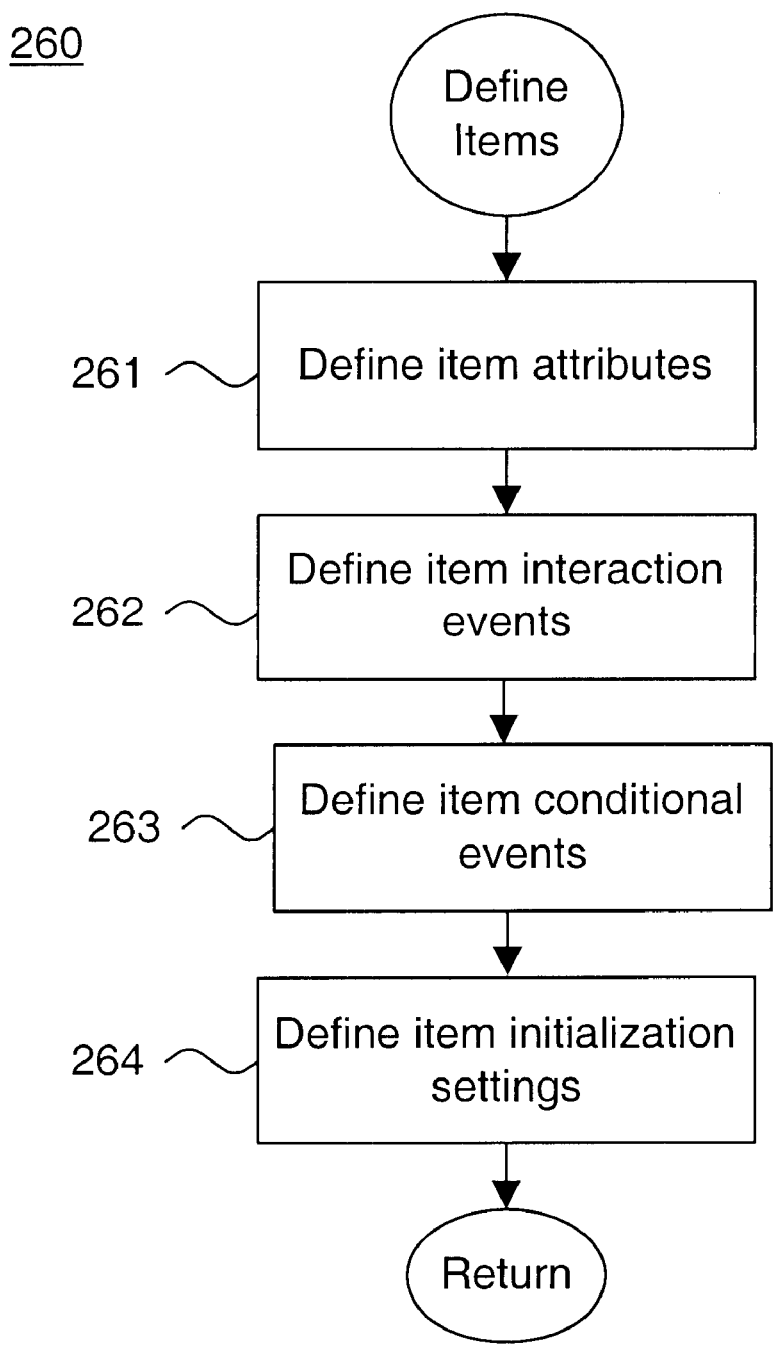
FIG. 22 is a flow diagram showing a routine for defining items for use in the routine of FIG. 20.

FIG. 22 is a flow diagram showing the routine 260 for defining items of influence for use in the routine of FIG. 20. The purpose of this routine is to specify virtual or physical objects, which can be manipulated through the various events associated with the zones of influence.

First, attributes for each item are defined (block 261). Item attributes include both logical and physical characteristics, such as color, size and description. The interaction between the items and events are then defined (block 262). Similarly, events which are conditioned on an item are defined (block 264). Finally, item initialization settings are defined (block 264), after which the routine returns.

Figure 23:
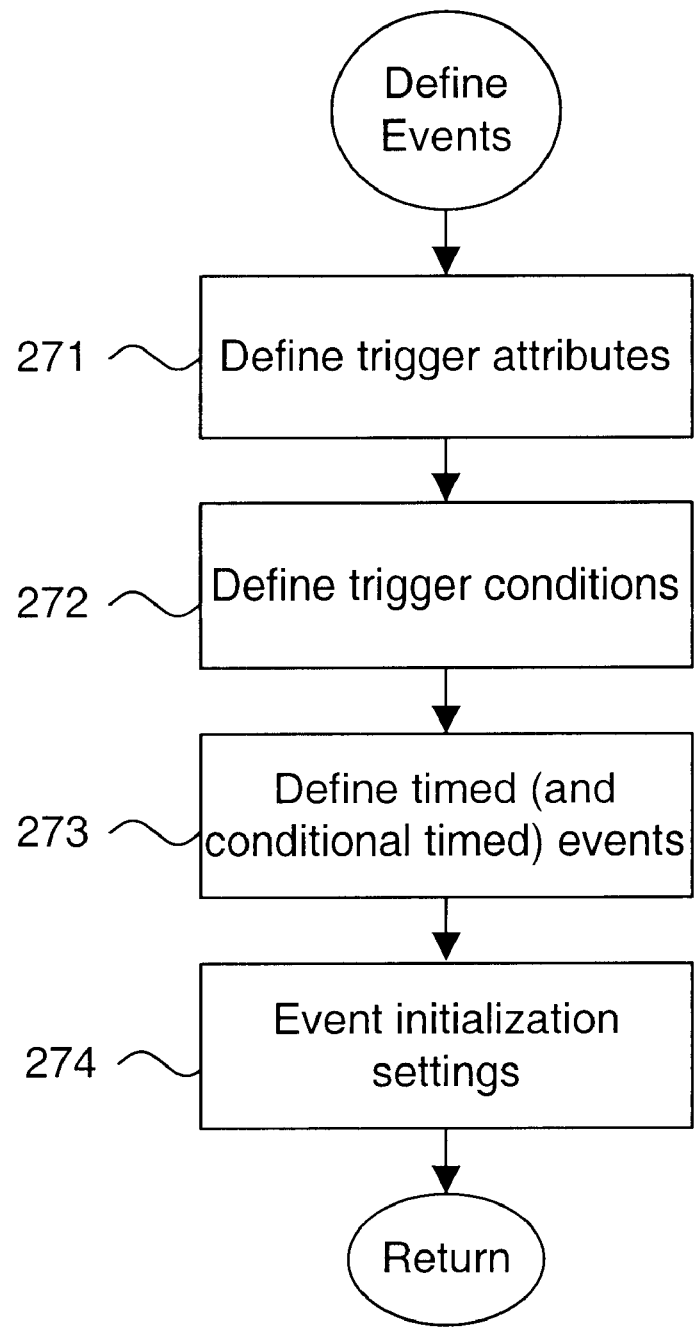
FIG. 23 is a flow diagram showing a routine for defining events for use in the routine of FIG. 20.

FIG. 23 is a flow diagram showing the routine 270 for defining events for use in the routine of FIG. 20. The purpose of this routine is to specify time-based triggers, which occur programmatically within a cartridge.

First, trigger attributes are defined (block 281). The trigger attributes include properties specific to the type of trigger defined, such as timer values or exact times. Next, trigger conditions are defined (block 272), such as conditions which exist at certain time intervals or exact times. Similarly, timed and conditionally timed events are defined (block 273). Finally, event initialization's settings, such as for recurring events, are defined (block 274). The routine returns.

Figure 24:
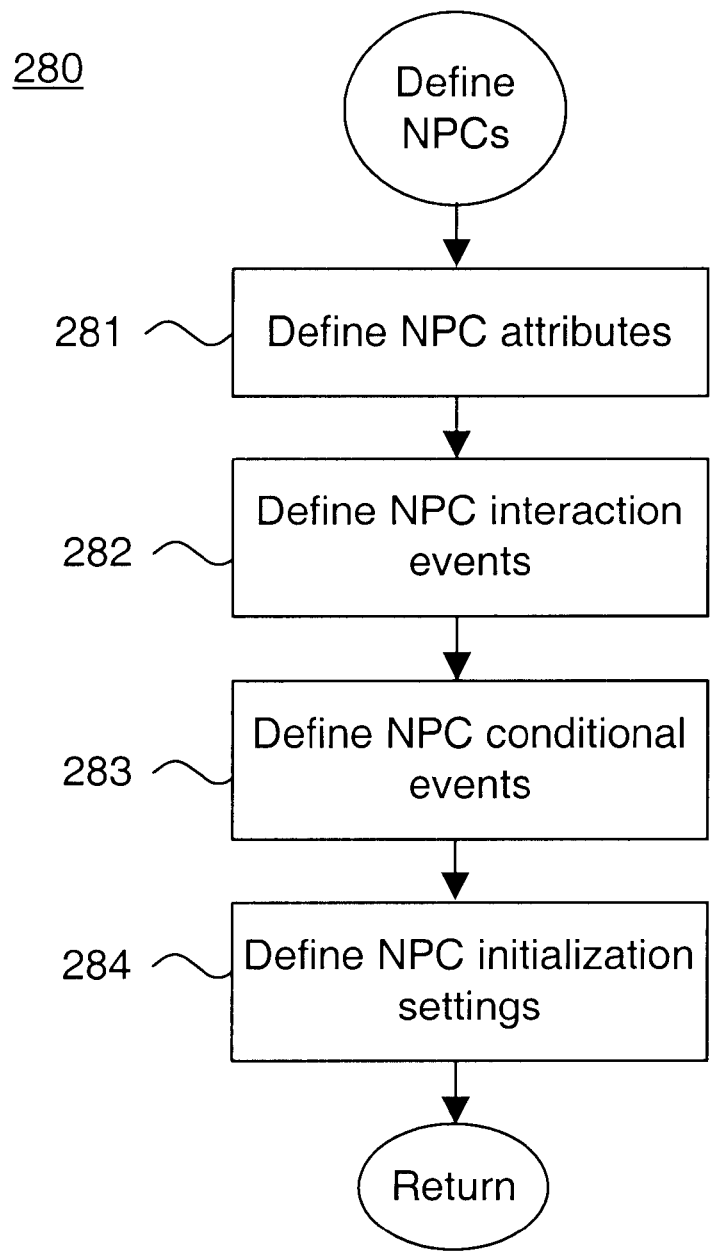
FIG. 24 is a flow diagram showing a routine for defining non-player characters for use in the routine of FIG. 20.

FIG. 24 is a flow diagram showing the routine 280 for defining non-player characters for use in the routine of FIG. 20. The purpose of this routine is to create a fictional non-participative character with whom a player character can interact through query and response behaviors.

First, the attributes of the non-player characters are defined (block 281). These attributes are similar to those defined for a player character with the addition of cartridge-specific characteristics. Interactions between the non-player characters and events are then defined (block 282). Similarly, events conditioned on the non-player characters are defined (block 283). Finally, non-player character initialization settings are defined (block 284), after which the routine returns.

Figure 25:
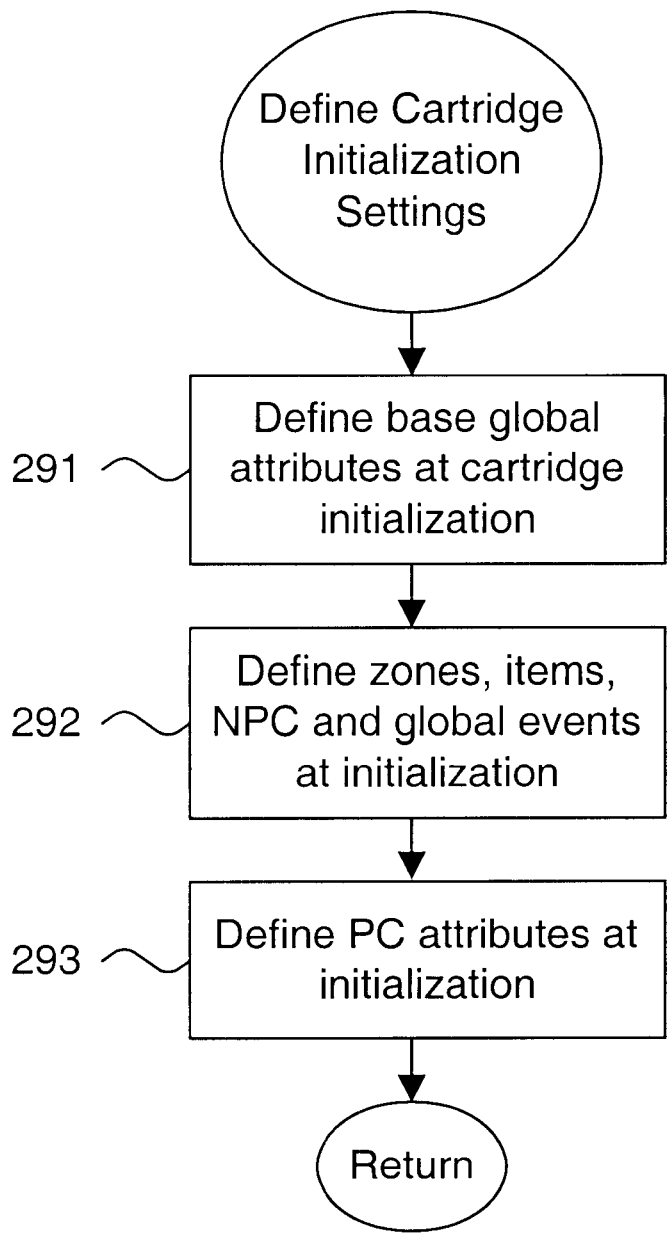
FIG. 25 is a flow diagram showing a routine for defining cartridge initialization settings for use in the routine of FIG. 20.

FIG. 25 is a flow diagram showing the routine 290 for defining cartridge initialization settings for use in the routine of FIG. 20. The purpose of this routine is to specify the initial values for the various characteristics for a cartridge storing a sequence of events for a set of zones of influence.

First, the base level attributes for the cartridge upon initialization are defined (block 291). The zones of influence, items, non-player characters, and global events present at initialization are defined (block 292). Lastly, the player character attributes at initialization for the current player are defined (block 293). The routine then returns.

Figure 26:
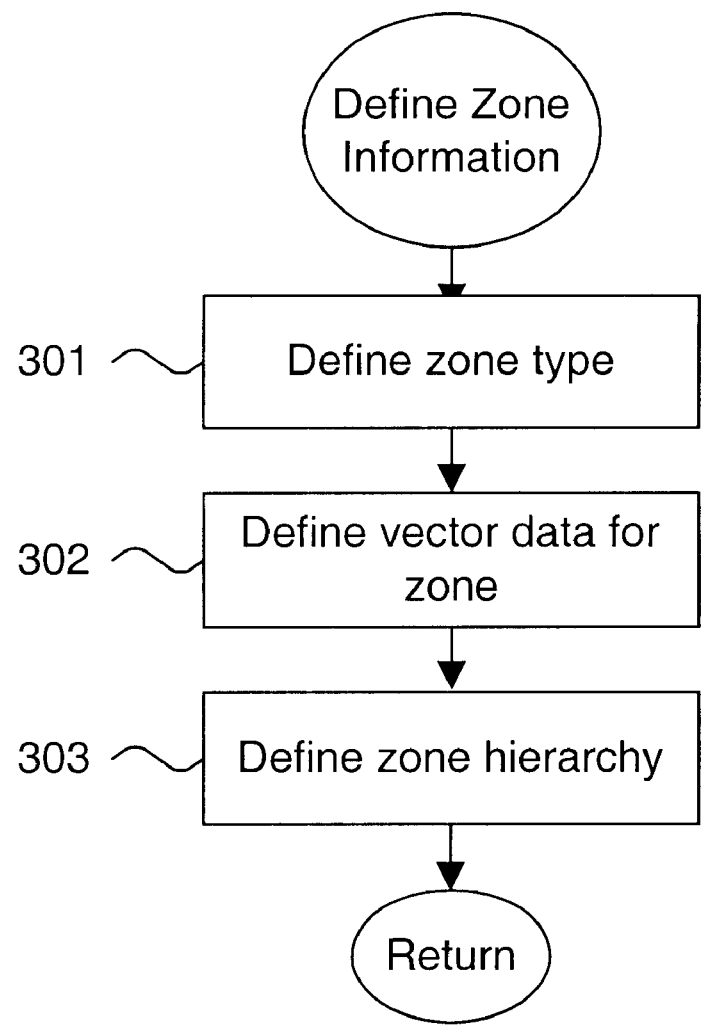
FIG. 26 is a flow diagram showing a routine for defining zone information for use in the routine of FIG. 21.

FIG. 26 is a flow diagram showing the routine 300 for defining zone information for use in the routine of FIG. 21. The purpose of this routine is to specify the geolocational data for a zone of influence.

First, a zone of influence type is defined (block 301). As described above with reference to FIGS. 2A–B, 3A–B, 4, and 5A–B, zones of influence can be two- or three-dimensional and be defined by vector or radius values, or combinations thereof. Next, vector data specifying the zone of influence dimensions are defined (block 302). Finally, the hierarchy for the zone, that is, level, is defined (block 303), if applicable. The routine then returns.

While the invention has been particularly shown and described as referenced to the embodiments thereof, those skilled in the art will understand that the foregoing and other changes in form and detail may be made therein without departing from the spirit and scope of the invention.

APPENDIX

```
<cartridge version ="0.1b" company="Groundspeak"name="Generic Golf Course">
    ( . . . Define Global zone properties)
    <zones>
        <zone id=200 layer="+3">
            <name>Hole 18: Green (Radial Zone Example)</name>
            <description>You're on the Green!</description>
            <shape="radial" dimension=2 measurement="km">.015</shape>
            <vectors datum= "WGS84">
                <point id=1 lat=47.655 Ion=-122.001 altitutde=300>
            </vectors>
            <on_enter>
                <trigger_event desc="Entering Hole 18 Green">64</trigger_event>
                <pc_set attribute="position" recurring=true>Entered the Green</pc set>
                <set_score recurring=false>+20</set_score>
            </on_enter>
            <on_exit>
                <trigger_event desc="Leaving Hole 18 Green">123</trigger_event>
                <pc_set attribute="position"recurring=true>Left the Green</pc_set>
            </on_exit>
            <proximity measurement="m"distance=5 desc="Close to the Green">
                <trigger_event>222</trigger event>
            </proximity>
        </zone>
        <zone id=200 layer="+3">
            <name>Hole 18: Sand Trap (Vector Zone Example)</name>
            <description>You are in the sand trap. Good luck!</description>
            <shape="vector" dimension=2/>
            <vectors datum="WGS84">
                <point id=1 lat=47.XXX Ion=-122.XXX/>
                <point id=2 lat=47.XXX Ion=-122.XXX/>
                . . .
                </point id=450 lat=47.XXX Ion=-122.XXX/>
            </vectors>
            <on_enter>
                <trigger_event desc="Entering Hole 18 Sand Trap">164</trigger_event>
                <pc_set_attribute="position"recurring=true>In the Sand Trap</pc_set>
                <set_score recurring=true>-5</set score>
            </on_enter>
            <on_exit>
                <trigger_event desc="Leaving Hole 18 Green>123</trigger_event>
                <pc_set attribute="position"recurring=true>Outside Sand Trap</pc_set>
            </on_exit>
            <proximity measurement="m" distance=5 desc="Danger! Near Sand Trap">
                <trigger_event>232</trigger event>
            </proximity>
        </zone>
        <items>
            <item id=12>
            <short_name>a Golf Ball<short_name>
            >long_name>a brand new golf ball</long_name>
            <description>It looks like your typical golf ball</description>
            <action_command="crush">
                <destroy_item id=12/>
            </action>
            </item>
        </items>
        <npcs>
```

APPENDIX-continued

```
        <npc id=32>
          <short_name>Charles the Caddy<short_name>
          <action command="recommend">
             . . . trigger some action
          </action>
          <topics>
             <topic name="Golf">
                <topic/>
             </topic>
          <topics>
          </npc>
     </npcs>
     <events>
        <event id=64 type="execute/recurring|time">
          <conditions>
             </triggers>
          </conditions>
          <triggers>
             <set_attributes />
             <play_media/>
          </triggers>
        </event>
     </events>
     <initialization>
        <create_zone id=200/>
        <create_item id=12 lat=47.675 Ion=-122.123/>
        <create_npc id=32 lat=47.678 Ion=-122.234/>
        <set_score>0</set_score>
     </initialization>
</cartridge>
```

What is claimed is:

1. A system for executing user-definable events triggered through geolocational data describing zones of influence, comprising:

a cartridge defining one or more zones of influence, each zone of influence described by stored geolocational data and forming a logically enclosed physical space, the cartridge further associating one or more user-definable events with each zone of influence, each user-definable event specifying a trigger condition based on the stored geolocational data for the associated zone of influence;

a user device identifying a location based on further geolocational data and triggering at least one user-definable event when the location substantially correlates to the stored geolocational data for the trigger condition of the at least one user-definable event;

the cartridge further defining one or more timed events specified by a start time and a duration and associating one or more of the user-definable events with each timed event;

a timer measuring an elapsed time from the start time of each timed event; and the trigger triggering at least one user-definable event when the elapsed time substantially equals the duration of one such timed event.

2. A system according to claim 1, further comprising:

the cartridge associating one or more events with at least one of the zones of influence.

3. A system according to claim 1, further comprising:

a validity module evaluating feasibility of the location relative to a previously-determined location.

4. A system according to claim 1, wherein the timed event comprises an independent condition comprising at least one of a global condition, zone condition, non-player condition, player condition, and object condition.

5. A system according to claim 1, further comprising:

the trigger triggering at least one user-definable event upon at least one of an entry into or exit from one such zone of influence.

6. A system according to claim 1, further comprising:

a proximity cartridge measuring a proximity relative to at least such the zone of influence; and the trigger triggering at least one user-definable event correlating the proximity to an independent condition.

7. A system according to claim 6, wherein the independent condition comprises at least one of one such zone of influence, player character, non-player character, and object.

8. A system according to claim 1, further comprising:

the cartridge defining one or more independent trigger conditions and associating one or more of the user-definable events with each independent trigger condition; and the trigger triggering at least one user-definable event upon satisfaction of at least one independent trigger condition.

9. A system according to claim 8, further comprising:

the cartridge specifying at least one user-initiated independent trigger condition.

10. A system according to claim 9, wherein the independent trigger condition comprises at least one of a global condition, zone condition, self condition, player condition, non-player condition, and object condition.

11. A system according to claim 8, further comprising:

the cartridge specifying at least one of player independent trigger conditions and non-player independent trigger conditions.

12. A system according to claim 1, further comprising:

an event queue temporarily storing each triggered user-definable event pending execution.

13. A system according to claim 1, further comprising:

the cartridge specifying each zone of influence as discrete, adjoining, overlapping, and nested relative to at least one other zone of influence.

14. A system according to claim 1, further comprising:
the cartridge specifying at least one zone of influence as inheriting at least one user-definable events from one or more other of the zones of influence.

15. A system according to claim 1, wherein the user device provides processing, locational and output capabilities.

16. A system according to claim 15, wherein the processing capabilities are provided by at least one of a personal or laptop computer, either a wireless or standard personal data assistant, a programmable cellular telephone, a programmable pager, a wireless email client, a two-way radio, and a dedicated processing device, the locational capabilities are provided by at least one of a standalone GPS receiver attached via a conventional cable, GPS receiver components incorporated into the processing capable device and a receiver for receiving signals from a stationary GPS beacon, and the output capabilities are provided by at least one of the processing capable device and an augmented reality device.

17. A system according to claim 1, further comprising:
a global positioning satellite (GPS) receiver receiving global positioning satellite (GPS) signals and processing the GPS signals to determine the location.

18. A system according to claim 1, further comprising:
the cartridge specifying the geolocational data as one or more text sentences.

19. A system according to claim 1, further comprising:
the cartridge specifying the geolocational data as latitude and longitude values.

20. A system according to claim 1, further comprising:
a database maintaining a user profile.

21. A system according to claim 1, further comprising:
a database providing points of interest data.

22. A system according to claim 1, wherein each user-definable event comprises at least one of a sound effect, visual effect, tactile effect, olfactory effect, and multimedia display.

23. A method for executing user-definable events triggered through geolocational data describing zones of influence, comprising:
defining one or more zones of influence, each zone of influence described by stored geolocational data and forming a logically enclosed physical space;
associating one or more user-definable events with each zone of influence, each user-definable event specifying a trigger condition based on the stored geolocational data for the associated zone of influence;
identifying a location of a user device based on further geolocational data and triggering at least one user-definable event when the location of the user device substantially correlates to the stored geolocational data for the trigger condition of the at least one user-definable event;
defining one or more timed events specified by a start time and a duration;
associating one or more of the user-definable events with each timed event;
measuring an elapsed time from the start time of each timed event; and
triggering at least one user-definable event when the elapsed time substantially equals the duration of one such timed event.

24. A method according to claim 23, further comprising:
receiving global positioning satellite (GPS) signals through a GPS receiver and processing the GPS signals to determine the location.

25. A method according to claim 23, further comprising:
associating one or more events with at least one of the zones of influence.

26. A method according to claim 23, further comprising:
evaluating feasibility of the location relative to a previously-determined location.

27. A method according to claim 23, wherein the timed event comprises an independent condition comprising at least one of a global condition, zone condition, non-player condition, player condition, and object condition.

28. A method according to claim 23, further comprising:
triggering at least one user-definable event upon at least one of an entry into or exit from one such zone of influence.

29. A method according to claim 23, further comprising:
measuring a proximity relative to at least such the zone of influence; and
triggering at least one user-definable event correlating the proximity to an independent condition.

30. A method according to claim 29, wherein the independent condition comprises at least one of one such zone of influence, player character, non-player character, and object.

31. A method according to claim 23, further comprising:
defining one or more independent trigger conditions;
associating one or more of the user-definable events with each independent trigger condition; and
triggering at least one user-definable event upon satisfaction of at least one independent trigger condition.

32. A method according to claim 31, further comprising:
specifying at least one user-initiated independent trigger condition.

33. A method according to claim 32, wherein the independent trigger condition comprises at least one of a global condition, zone condition, self condition, player condition, non-player condition, and object condition.

34. A method according to claim 31, further comprising:
specifying at least one of player independent trigger conditions and non-player independent trigger conditions.

35. A method according to claim 23, further comprising:
maintaining an event queue temporarily storing each triggered user-definable event pending execution.

36. A method according to claim 23, further comprising:
specifying each zone of influence as discrete, adjoining, overlapping, and nested relative to at least one other zone of influence.

37. A method according to claim 23, further comprising:
specifying at least one zone of influence as inheriting at least one user-definable events from one or more other of the zones of influence.

38. A method according to claim 23, wherein the user device provides processing, locational and output capabilities.

39. A method according to claim 38, wherein the processing capabilities are provided by at least one of a personal or laptop computer, either a wireless or standard personal data assistant, a programmable cellular telephone, a programmable pager, a wireless email client, a two-way radio, and a dedicated processing device, the locational capabilities are provided by at least one of a standalone GPS receiver attached via a conventional cable, GPS receiver components incorporated into the processing capable device and a receiver for receiving signals from a stationary GPS beacon, and the output capabilities are provided by at least one of the processing capable device and an augmented reality device.

40. A method according to claim 23, further comprising: receiving global positioning satellite (GPS) signals using a global positioning satellite (GPS) receiver and processing the GPS signals to determine the location.

41. A method according to claim 23, further comprising: specifying the geolocational data as one or more text sentences.

42. A method according to claim 23, further comprising: specifying the geolocational data as latitude and longitude values.

43. A method according to claim 23, further comprising: maintaining a user profile in a database.

44. A method according to claim 23, further comprising: providing points of interest data.

45. A method according to claim 23, wherein each user-definable event comprises at least one of a sound effect, visual effect, tactile effect, olfactory effect, text effect, and multimedia display.

46. A computer-readable storage medium holding code for performing the method according to claim 23.

47. A system for producing user-definable events triggerable through geolocational data describing zones of influence, comprising:
 a database maintaining one or more templates, each template specifying a generic layout for a cartridge expressed in a tag-delimited page description language;
 at least one such cartridge defined with the templates, comprising:
  one or more zones of influence described by geolocational data and forming a logically enclosed physical space;
  one or more user-definable events stored with each zone of influence, each user-definable event triggering an action when a location substantially correlates to the geolocational data describing at least one zone of influence;
  one or more timed events specified by a start time and a duration; and
  one or more of the user-definable events stored with each timed event, each user-definable event triggering an action when an elapsed time substantially equals the duration of one such timed event; and
 a compiler compiling each cartridge into an executable script.

48. A system according to claim 47, wherein the timed event comprises an independent condition comprising at least one of a global condition, zone condition, non-player condition, player condition, and object condition.

49. A system according to claim 47, further comprising: at least one user-definable event triggered upon at least one of an entry into or exit from one such zone of influence.

50. A system according to claim 47, further comprising: at least one user-definable event triggered by correlating a proximity relative to at least one such zone of influence to an independent condition.

51. A system according to claim 50, wherein the independent condition comprises at least one of one such zone of influence, player character, non-player character, and object.

52. A system according to claim 47, further comprising: the at least one cartridge, further comprising:
 one or more independent trigger conditions; and
 one or more of the user-definable events stored with each independent trigger condition, each user-definable event triggering an action upon satisfaction of at least one independent trigger condition.

53. A system according to claim 52, further comprising: at least one user-initiated independent trigger condition.

54. A system according to claim 53, wherein the independent trigger condition comprises at least one of a global condition, zone condition, self condition, player condition, non-player condition, and object condition.

55. A system according to claim 52, further comprising: at least one of player independent trigger conditions and non-player independent trigger conditions.

56. A system according to claim 47, further comprising: each zone of influence specified as discrete, adjoining, overlapping, and nested relative to at least one other zone of influence.

57. A system according to claim 47, further comprising: the geolocational data specified as latitude and longitude values.

58. A system according to claim 47, wherein the tag-delimited page description language comprises at least one of HTML and XML.

59. A system according to claim 47, wherein each user-definable event comprises at least one of a sound effect, visual effect, tactile effect, olfactory effect, text effect, and multimedia display.

60. A method for producing user-definable events triggerable through geolocational data describing zones of influence, comprising:
 maintaining one or more templates, each template specifying a generic layout for a cartridge expressed in a tag-delimited page description language;
 defining at least one such cartridge with the templates comprising:
  describing one or more zones of influence by geolocational data and forming a logically enclosed physical space; and
  storing one or more user-definable events with each zone of influence, each user-definable event triggering an action when a location substantially correlates to the geolocational data describing at least one zone of influence;
  specifying one or more timed events by a start time and a duration; and
  storing one or more of the user-definable events with each timed event, each user-definable event triggering an action when an elapsed time substantially equals the duration of one such timed event; and
 compiling each cartridge into an executable script.

61. A method according to claim 60, wherein the timed event comprises an independent condition comprising at least one of a global condition, zone condition, non-player condition, player condition, and object condition.

62. A method according to claim 60, further comprising: specifying at least one user-definable event triggered upon at least one of an entry into or exit from one such zone of influence.

63. A method according to claim 60, further comprising: specifying at least one user-definable event triggered by correlating a proximity relative to at least such the zone of influence to an independent condition.

64. A method according to claim 63, wherein the independent condition comprises at least one of one such zone of influence, player character, non-player character, and object.

65. A method according to claim 60, further comprising:
further defining the at least one cartridge, comprising:
   specifying one or more independent trigger conditions; and
   storing one or more of the user-definable events with each independent trigger condition, each user-definable event triggering an action upon satisfaction of at least one independent trigger condition.

66. A method according to claim 65, further comprising:
specifying at least one user-initiated independent trigger condition.

67. A method according to claim 66, wherein the independent trigger condition comprises at least one of a global condition, zone condition, self condition, player condition, non-player condition, and object condition.

68. A method according to claim 65, further comprising:
specifying at least one of player independent trigger conditions and non-player independent trigger conditions.

69. A method according to claim 60, further comprising:
specifying each zone of influence as discrete, adjoining, overlapping, and nested relative to at least one other zone of influence.

70. A method according to claim 60, further comprising:
specifying the geolocational data as latitude and longitude values.

71. A method according to claim 60, wherein the tag-delimited page description language comprises at least one of HTML and XML.

72. A method according to claim 60, wherein each user-definable event comprises at least one of a sound effect, visual effect, tactile effect, olfactory effect, and multimedia display.

73. A computer-readable storage medium holding code for performing the method according to claim 60.

* * * * *

UNITED STATES PATENT AND TRADEMARK OFFICE
CERTIFICATE OF CORRECTION

| | | |
|---|---|---|
| PATENT NO. | : 6,691,032 B1 | Page 1 of 1 |
| APPLICATION NO. | : 10/237292 | |
| DATED | : February 10, 2004 | |
| INVENTOR(S) | : Irish et al. | |

It is certified that error appears in the above-identified patent and that said Letters Patent is hereby corrected as shown below:

Column 22,
Line 30, add comma after "templates."

Signed and Sealed this

Twenty-fourth Day of October, 2006

JON W. DUDAS
*Director of the United States Patent and Trademark Office*